US010277896B2

(12) United States Patent
Cote et al.

(10) Patent No.: US 10,277,896 B2
(45) Date of Patent: Apr. 30, 2019

(54) INTRA-FRAME PREDICTION SYSTEMS AND METHODS

(71) Applicant: Apple Inc., Cupertino, CA (US)

(72) Inventors: Guy Cote, San Jose, CA (US); Athanasios Leontaris, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 350 days.

(21) Appl. No.: 15/004,479

(22) Filed: Jan. 22, 2016

(65) Prior Publication Data

US 2017/0214912 A1 Jul. 27, 2017

(51) Int. Cl.
| | |
|---|---|
| H04N 19/11 | (2014.01) |
| H04N 19/124 | (2014.01) |
| H04N 19/154 | (2014.01) |
| H04N 19/61 | (2014.01) |
| H04N 19/593 | (2014.01) |
| H04N 19/132 | (2014.01) |

(52) U.S. Cl.
CPC .......... *H04N 19/11* (2014.11); *H04N 19/124* (2014.11); *H04N 19/132* (2014.11); *H04N 19/154* (2014.11); *H04N 19/593* (2014.11); *H04N 19/61* (2014.11)

(58) Field of Classification Search
CPC ............................. H04N 19/11; H04N 19/124
See application file for complete search history.

(56) References Cited

U.S. PATENT DOCUMENTS

| 9,769,472 B2* | 9/2017 | Liu ..................... H04N 19/105 |
| 2012/0177112 A1* | 7/2012 | Guo ..................... H04N 19/13 |
| | | 375/240.12 |
| 2012/0201311 A1* | 8/2012 | Sole ..................... H04N 19/176 |
| | | 375/240.29 |
| 2013/0022120 A1 | 1/2013 | Gupte et al. |
| 2013/0343464 A1 | 12/2013 | Van der Auwera et al. |
| 2014/0010293 A1* | 1/2014 | Srinivasan ........... H04N 19/119 |
| | | 375/240.12 |
| 2014/0092965 A1 | 4/2014 | Joshi et al. |
| 2015/0092855 A1 | 4/2015 | Chou et al. |
| 2015/0124865 A1 | 5/2015 | Kim et al. |
| 2015/0326883 A1 | 11/2015 | Rosewarne |
| 2017/0026645 A1* | 1/2017 | Zhou .................... H04N 19/124 |

* cited by examiner

*Primary Examiner* — Anner N Holder
*Assistant Examiner* — Hesham K Abouzahra
(74) *Attorney, Agent, or Firm* — Fletcher Yoder PC

(57) ABSTRACT

System and method for improving operational efficiency of a video encoding pipeline, which includes a mode decision block that selects a luma intra-frame prediction mode used to encode a luma component of the source image data and a chroma reconstruction block that determines a first distortion expected to result in a first chroma transform block when each of a plurality of candidate chroma intra-frame prediction modes is implemented based on reconstructed image data, determines a second distortion expected to result in a second chroma transform block of the prediction unit when each of the plurality of candidate chroma intra-frame prediction modes is implemented based at least in part on the source image data, and selects a chroma intra-frame prediction mode used to encode a chroma component from the plurality of candidate chroma intra-frame prediction modes based at least in part on the first distortion and the second distortion.

19 Claims, 11 Drawing Sheets

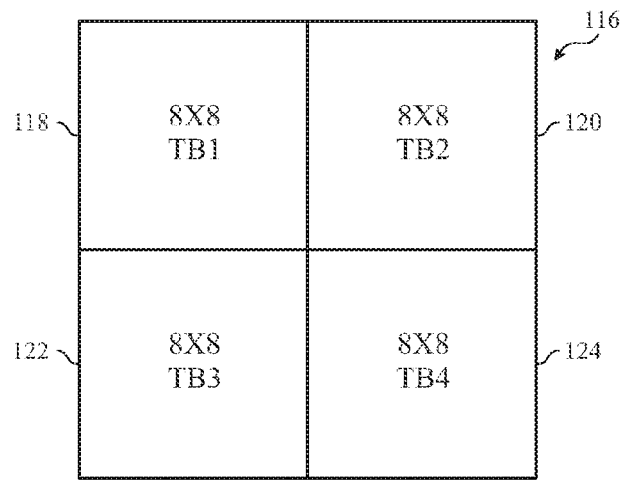
*FIG. 11*
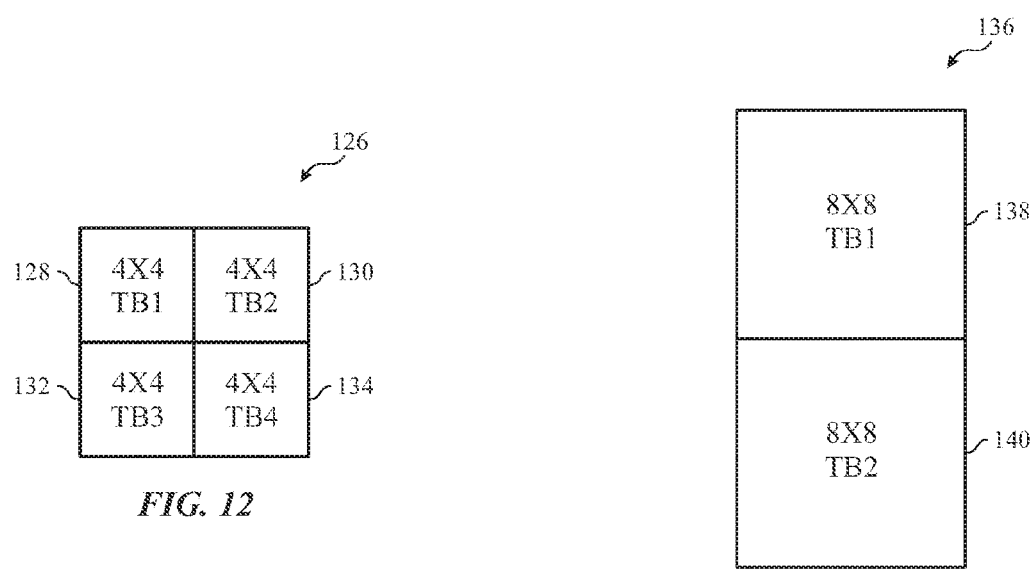
*FIG. 12*
*FIG. 13*

INTRA-FRAME PREDICTION SYSTEMS AND METHODS

BACKGROUND

The present disclosure generally relates to image data encoding and, more particularly, to intra-frame prediction for image data encoding.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Often, an electronic device may present visual representations of information as image frames displayed on an electronic display based on image data. Since image data may be received from another electronic device and/or stored in the electronic device, the image data may be encoded (e.g., compressed) to reduce size (e.g., number of bits) and, thus, resources (e.g., transmission bandwidth and/or memory addresses) used to transmit and/or store image data. To display image frames, the electronic device may decode encoded image data and instruct the electronic display to adjust luminance of display pixels based on the decoded image data.

To facilitate encoding, prediction techniques may be used to indicate the image data by referencing other image data. For example, since an image frame may change gradually, intra-frame prediction techniques may be used to indicate image data of a first portion (e.g., a prediction unit) of the image frame by referencing image data of a second portion (e.g., a reference sample) of the image frame. Various intra-frame prediction modes may be used to indicate the image data, for example, as an average of other image data. In other words, instead of directly compressing the image data, the image data may be encoded based at least in part on other image data in the same image frame to indicate its desired value.

However, determining which intra-frame prediction mode to use to encode image data may be computationally complex, for example, due to operations (e.g., forward transform, inverse transform, forward quantization, and/or inverse quantization) used to evaluate multiple candidate intra-frame prediction modes. In some instances, computational complexity may affect ability to image data for real-time or near real-time display and/or transmission. Additionally, in some instances, computational complexity may affect amount of circuitry (e.g., hardware footprint) used to encode the image data. Furthermore, in some instances, computational complexity may affect power consumption used to encode the image data.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure generally relates to encoding source image data, which may enable reducing transmission bandwidth and/or memory usage. To facilitate encoding, a chroma reconstruction block may determine a chroma intra-frame prediction mode used to encode source image data corresponding with a prediction unit. To determine the chroma intra-frame prediction mode, the chroma reconstruction block may evaluate multiple candidate chroma intra-frame prediction modes based on distortion expected to result in decoded image data corresponding with the prediction unit.

To facilitate reducing computational complexity, the chroma reconstruction block may determine distortion expected to result from each candidate prediction mode based difference (e.g., sum of absolute transformed difference, sum of absolute difference, or sum of squared difference) between source image data and corresponding prediction samples. In some embodiments, prediction samples may be less computationally complex to determine compared to reconstructed samples. As such, the chroma mode decision may determine expected distortion of each candidate prediction mode based on the prediction samples instead of a reconstructed sample to facilitate reducing computational complexity and, thus, operating duration of the video encoding pipeline, amount of circuitry used to implement the video encoding pipeline (e.g., hardware footprint), and/or power consumption of the video encoding pipeline.

Additionally, to facilitate reducing computational complexity, the chroma reconstruction block may determine distortion expected to result from a candidate prediction mode based at least in part on source image data when the prediction unit includes multiple transform blocks per component (e.g., Y, Cr, or Cb). For example, when the prediction unit includes a first (e.g., top) chroma transform block and a second (e.g., bottom) chroma transform block, the chroma reconstruction block may determine distortion expected to result in the first chroma transform block based on first (e.g., top) neighboring reconstructed image data and second (e.g., left) neighboring reconstructed image data. Additionally, the video encoding pipeline may determine distortion expected to result in the second transform block based on third (e.g., left) neighboring reconstructed image data and neighboring (e.g., top neighboring) source image data. Since determined based on neighboring source image data, the video encoding pipeline may determine a prediction sample even before reconstructed image data is determined for the first transform block. In this manner, prediction samples of multiple transform blocks in the prediction unit used to evaluate candidate prediction modes may be determined at least partially in parallel, which may facilitate reducing computational complexity and, thus, operating duration of the video encoding pipeline, amount of circuitry used to implement the video encoding pipeline (e.g., hardware footprint), and/or power consumption of the video encoding pipeline.

Furthermore, to facilitate reducing computational complexity, the chroma reconstruction block may determine whether to skip transforms (e.g., a forward transform and an inverse transform) used to determine a reconstructed chroma sample. In some embodiments, the chroma reconstruction block may determine transform skip decision of a chroma transform block based at least in part on transform skip decision of luma transform blocks in the same coding unit. For example, the chroma reconstruction block may skip transforms for a chroma transform block when number of luma transform blocks in the coding unit with transform skips is greater than a threshold. On the other hand, the chroma reconstruction block may perform transforms for the chroma transform block when the number of luma transform block in the coding unit with transform skips is not greater than the threshold. In this manner, the chroma reconstruction block may determine transform skip decision for chroma transform blocks without directly analyzing the source image data, which may facilitate reducing computational complexity and, thus, operating duration of the video encoding pipeline, amount of circuitry used to implement the video encoding pipeline (e.g., hardware footprint), and/or power consumption of the video encoding pipeline.

BRIEF DESCRIPTION OF THE DRAWINGS

Various aspects of this disclosure may be better understood upon reading the following detailed description and upon reference to the drawings in which:

FIG. 11 is a diagrammatic representation of a 16×16 chroma prediction block and 8×8 chroma transform blocks in the 16×16 prediction unit of FIG. 10, in accordance with an embodiment;

FIG. 12 is a diagrammatic representation of an 8×8 chroma prediction block and 4×4 chroma transform blocks in the 16×16 prediction unit of FIG. 10, in accordance with an embodiment;

FIG. 13 is a diagrammatic representation of an 8×16 chroma prediction block and 8×8 chroma transform blocks in the 16×16 prediction unit of FIG. 10, in accordance with an embodiment;

DETAILED DESCRIPTION

Figure 1:
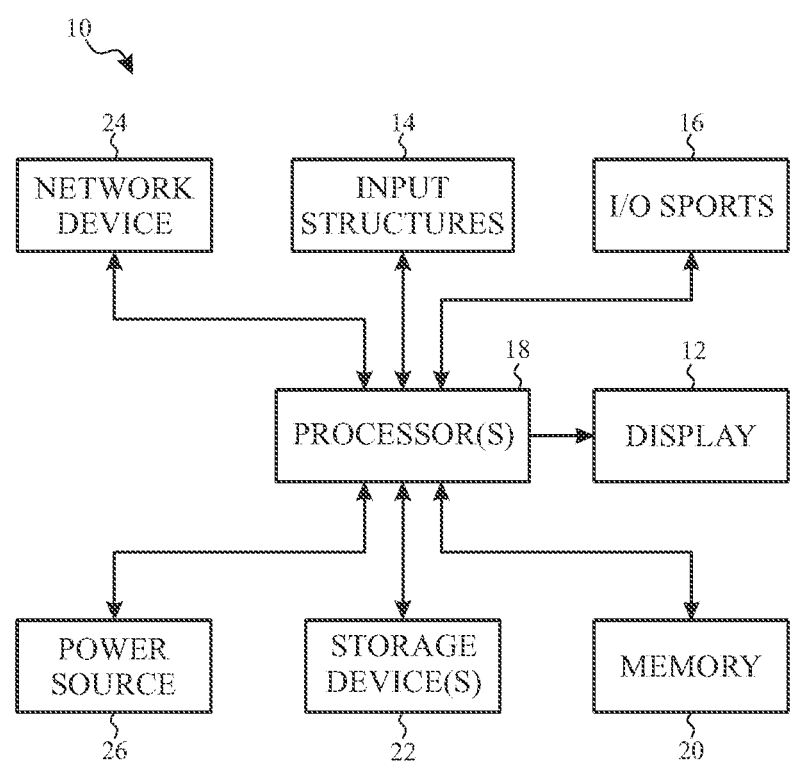
FIG. 1 is a block diagram of an electronic device, in accordance with an embodiment.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As mentioned above, an electronic device may facilitate visually presenting information by instructing an electronic display to display image frames based on image data. In some embodiments, the image data may be generated by an image sensor (e.g., digital camera) and stored in the electronic device. Additionally, when the image data is generated external from the electronic display, the image data may be transmitted to the electronic device. To reduce resource usage, image data may be encoded (e.g., compressed) to reduce size (e.g., number of bits) which, for example, may reduce transmission bandwidth and/or memory address usage.

To encode source image data, the video encoding pipeline may determine and implement the encoding parameters to encode the source image data. For example, to encode source image data of an image frame, the video encoding pipeline may determine prediction technique used to encode each coding unit in the image frame. As used herein, a "coding unit" is intended to describe samples (e.g., a luma component and chroma components) of image data corresponding to a group of pixels in an image frame, which is encoded using the same prediction technique (e.g., intra-frame prediction techniques or inter-frame prediction techniques).

As will be described in more detail below, the video encoding pipeline may apply prediction techniques to determine prediction samples, which may then used to determine prediction residuals. The video encoding pipeline may then perform forward transform and/or quantization (FTQ) on the prediction residuals based on quantization coefficients. Additionally, the video encoding pipeline may entropy encode and communicate the quantization coefficients to a decoding device for use in determining decoded image data.

Prediction techniques may facilitate encoding by enabling the source image data to be indicated via reference to other image data. For example, since an image frame may change gradually, the video encoding pipeline may utilize an intra-frame prediction technique to indicate image data with reference to other (e.g., neighboring) image data in the same image frame. Additionally, since successively displayed image frames may change gradually, the video encoding pipeline may utilize an inter-frame prediction technique to indicate image data with reference to image data in other (e.g., directly previous or directly subsequent) image frames.

To encode a coding unit, the video encoding pipeline may determine prediction mode used to encode each prediction unit in the coding unit. As used herein, a "prediction unit" is intended to describe a sample of image data within a coding unit with a luma prediction block (e.g., luma component), which utilizes the same luma prediction mode, and a chroma prediction block (e.g., chroma component), which utilizes the same chroma prediction mode. In some embodiments, a coding unit may include a single prediction unit. In other embodiments, the coding unit may be divided into multiple prediction units, which may use different luma prediction modes and/or different chroma prediction modes.

Although conceptually similar, prediction modes of the same prediction technique may utilize different encoding schemes and, thus, result in different prediction samples. For example, utilizing a first intra-frame prediction mode (e.g., vertical prediction mode), the video encoding pipeline may produce a prediction sample of a transform unit with each column set equal to a reference sample (e.g., image data) directly above the column. On the other hand, utilizing a second intra-frame prediction mode (e.g., DC prediction mode), the video encoding pipeline may produce a prediction sample of the transform unit set equal to an average of adjacent reference samples (e.g., neighboring image data). Additionally, utilizing a first inter-frame prediction mode (e.g., first reference index and first motion vector), the video encoding pipeline may produce a prediction sample of a prediction unit based on a reference sample at a first position within a first image frame. On the other hand, utilizing a second inter-frame prediction mode (e.g., second reference index and second motion vector), the video encoding pipeline may produce a prediction sample of a prediction unit based on a reference sample at a second position within a second image frame.

By applying a prediction mode, the video encoding pipeline may determine prediction samples that approximate the source image data. In some embodiments, the prediction samples of a prediction unit may be determined based on reconstructed image data corresponding with previously processed image data. Based at least in part on the prediction samples, the video encoding pipeline may determine prediction residuals based at least in part on difference between the prediction samples and the source image data. In some embodiments, the prediction residuals of the prediction unit may be quantized and/or transformed as one or more transform units to generate encoded prediction residuals. As used herein, a "transform unit" is intended to describe a sample of a coding unit whose prediction residual is quantized and/or transformed together.

In some embodiments, a coding unit may include a single transform unit. In other embodiments, the coding unit may be divided into multiple transform units. Additionally, in some embodiments, a prediction unit may include a single transform unit when encoded using intra-frame prediction techniques. In other embodiments, the prediction unit may be divided into multiple transform units when using intra-frame prediction techniques.

Additionally, a transform unit may include a transform block per component (e.g., Y, Cr, or Cb). For example, a transform unit may include a luma transform block per luma (e.g., Y) component and a chroma transform block per chroma (e.g., Cr or Cb). In other words, when the including two chroma components, the transform unit may include at least two chroma transform block (e.g., a Cr chroma transform block and a Cb chroma transform block).

Furthermore, in some embodiments, the size and/or location of a luma transform block and a chroma transform block within a transform unit may vary based at least in part on chroma sampling format. For example, using a 4:4:4 chroma sampling format, a 2N×2N transform unit may include a 2N×2N luma transform block and a 2N×2N chroma transform blocks per chroma component (e.g., Cb and Cr). Additionally, using a 4:2:2 chroma sampling format, the 2N×2N transform unit may include a 2N×2N luma transform block and two N×N chroma transform blocks per chroma component. Furthermore, using a 4:2:0 chroma sampling format, the 2N×2N transform unit may include a 2N×2N luma transform block and an N×N chroma transform block per chroma component.

Based at least in part on a corresponding prediction mode and encoded prediction residual, a decoding device may determine a decoded sample for a transform block. For example, to determine a decoded sample, the decoding device may apply the prediction mode based on previously decoded image data to determine a decoded prediction sample. Additionally, the decoding device may determine a decoded prediction residual based on the encoded prediction residual. In some embodiments, the decoding device may determine the decoded prediction residual by performing an inverse quantization and an inverse transform on the encoded prediction residual. By applying the decoded prediction residual to the decoded prediction sample, the decoding may determine the decoded sample for the transform block. In this manner, the decoding device may determine decoded image data, which may then be used to display an image frame.

To improve quality of the decoded image data, the video encoding pipeline may imitate operation of the decoding device. For example, the video encoding pipeline may determine a reconstructed sample of a transform block, which indicates an expected decoded sample of the transform block. In some embodiments, the video encoding pipeline may determine the reconstructed sample by applying a reconstructed prediction residual, which indicates an expected decoded prediction residual, to the prediction sample.

In some embodiments, the video encoding pipeline may determine the reconstructed prediction residual based at least in part on the prediction residual and/or the encoded prediction residual. For example, the video encoding pipeline may determine the reconstructed prediction residual by performing an inverse quantization and an inverse transform on the encoded prediction residual (e.g., when transform skip flags are set). Additionally or alternatively, the video encoding pipeline may determine the reconstructed prediction residual by performing a forward transform, a forward quantization, an inverse transform, and an inverse quantization on the prediction residual.

As described above, the video encoding pipeline may utilize various prediction modes to encode a prediction unit. Thus, in some embodiments, the video encoding pipeline may evaluate multiple candidate prediction modes based at least in part on distortion expected to result in a decoded sample. For example, the video encoding pipeline may determine expected distortion of a candidate prediction mode based on the sum of absolute difference (SAD) or sum of squared difference (SSD) between the source image data and a reconstructed sample.

As described above, in some embodiments, the video encoding pipeline may determine the reconstructed sample of a transform block based at least in part on a reconstructed prediction residual, which may be determined by performing a forward transform, a forward quantization, an inverse quantization, and an inverse transform on a prediction residual. However, performing forward quantizations, forward transforms, inverse transforms, and the inverse quantizations may be computationally complex, particularly when the prediction unit includes multiple transform units because some reconstructed image data used to determine the reconstructed sample may not be determined prior to encoding the prediction unit.

For example, when a prediction unit corresponds to a transform unit including a first (e.g., top) transform block and a second (e.g., bottom) transform block for a given component (e.g., Y, Cr, or Cb), reconstructed samples may be previously determined for a first (e.g., left) neighboring prediction unit and a second (e.g., top) neighboring prediction unit. As such, reconstructed image data that may be used to determine a prediction sample and/or a reconstructed sample of the first transform block may be previously determined. On the other hand, since part of the first transform block, reconstructed image data that may be used to determine a prediction sample and/or a reconstructed sample of the bottom transform block may not previously determined. Thus, in such embodiments, the prediction sample and/or the reconstructed sample of the second transform block may be determined after the reconstructed sample of the first transform block is determined (e.g., serially), which may further increase operating duration of the video encoding pipeline and/or power consumption of the video encoding pipeline.

Accordingly, as will be described in more detail below, the present disclosure provides techniques to improve operational efficiency of a video encoding pipeline, for example, by reducing computational complexity and, thus, operating duration of the video encoding pipeline, amount of circuitry used to implement the video encoding pipeline (e.g., hardware footprint), and/or power consumption of the video encoding pipeline. As described above, the video encoding pipeline may evaluate multiple candidate prediction modes to determine expected resulting distortion. To facilitate reducing operating duration, the video encoding pipeline may determine distortion expected to result from each candidate prediction mode based on a sum of absolute transformed difference (SATD), sum of absolute difference (SAD), or sum of squared difference (SSD), between source image data and corresponding prediction samples. As such, the video encoding pipeline may determine expected distortion of each candidate prediction mode based on the prediction samples instead of reconstructed samples. In this manner, number of forward transforms, forward quantizations, inverse quantizations, and/or inverse transforms performed may be reduced, thereby facilitating a reduction in computational complexity of the video encoding pipeline.

Moreover, the video encoding pipeline may facilitate reducing computational complexity when a prediction unit includes multiple transform blocks. In some embodiments, the video encoding pipeline may evaluate a candidate prediction mode based on distortion expected to result in one of the multiple transform blocks. For example, when a prediction unit includes a first (e.g., top) transform block and a second (e.g., bottom) transform block, the video encoding pipeline may select a prediction mode used to encode the prediction unit based on distortion expected to result in the first transform block, but not the second transform block. As described above, when based on reconstructed image data, the prediction samples and, thus, expected distortion of the first transform block and the second transform block may be determined serially. Accordingly, selecting a prediction mode based only on expected distortion of one transform block may facilitate a reduction in computational complexity (e.g., operating duration and/or power consumption) of the video encoding pipeline.

Additionally or alternatively, in some embodiments, the video encoding pipeline may evaluate a candidate prediction mode based on a combination of reconstructed image data and source image data. For example, when the prediction unit includes the first (e.g., top) transform block and the second (e.g., bottom) transform block, the video encoding pipeline may determine distortion expected to result in the first transform block based on first (e.g., top) neighboring reconstructed image data and second (e.g., left) neighboring reconstructed image data. Additionally, the video encoding pipeline may determine distortion expected to result in the second transform block based on third (e.g., left) neighboring reconstructed image data and neighboring (e.g., top neighboring) source image data. In this manner, prediction samples of multiple transform blocks in the same prediction unit used to evaluate candidate prediction modes may be determined at least partially in parallel, thereby facilitate a reduction in computational complexity (e.g., operating duration and/or power consumption) of the video encoding pipeline.

Furthermore, as described above, a reconstructed sample of a transform block may be determined based on a reconstructed prediction residual, for example, by performing transforms (e.g., a forward transform and an inverse transform) on a prediction residual. In some embodiments, performing the transforms may facilitate generating smaller and fewer nonzero quantization coefficients, which may facilitate improve compression efficiency (e.g., bits used to indicate a prediction residual). This is true for natural (e.g., non-synthetic) content, such as a photograph of a forest, which is characterized by smooth image data transitions. However, synthetic content (e.g., window border of a graphical user interface) may tend to have sharper transitions. Thus, performing the transforms on synthetic content may be unnecessary and, possibly, even lead to reduced compression efficiency.

In some embodiments, the video encoding pipeline may determine whether to perform the transforms based on various factors, such as gradient of source image data, which may provide an indication of expected effect performing the transforms has on compression efficiency. Additionally, in some embodiments, the video encoding pipeline may determine whether to skip the transforms on a chroma transform block in a prediction unit based at least in part on number of luma transform blocks in the prediction unit that skip the transforms. In this manner, the video encoding pipeline may improve quality of decoded image data while enabling number of transforms performed to be dynamically reduced, thereby facilitating reducing computational complexity (e.g., operating duration, circuitry used to implement, and/or power consumption) of the video encoding pipeline.

To help illustrate, a computing (e.g., electronic) device 10 that may utilize an electronic display 12 to display image frames based on image data and/or an image sensor 13 to capture image data is described in FIG. 1. As will be described in more detail below, the computing device 10 may be any suitable computing device, such as a handheld computing device, a tablet computing device, a notebook computer, and the like. Thus, it should be noted that FIG. 1 is merely one example of a particular implementation and is intended to illustrate the types of components that may be present in the computing device 10.

In the depicted embodiment, the computing device 10 includes the electronic display 12, the image sensor 13, input structures 14, input/output (I/O) ports 16, a processor core complex 18 having one or more processor(s) or processor cores, local memory 20, a main memory storage device 22, a network interface 24, and a power source 26. The various components described in FIG. 1 may include hardware elements (e.g., circuitry), software elements (e.g., a tangible, non-transitory computer-readable medium storing instructions), or a combination of both hardware and software elements. It should be noted that the various depicted components may be combined into fewer components or separated into additional components. For example, the local memory 20 and the main memory storage device 22 may be included in a single component.

As depicted, the processor core complex 18 is operably coupled with local memory 20 and the main memory storage device 22. Thus, the processor core complex 18 may execute instruction stored in local memory 20 and/or the main memory storage device 22 to perform operations, such as encoding image data captured by the image sensor 13 and/or decoding image data for display on the electronic display 12. As such, the processor core complex 18 may include one or more general purpose microprocessors, one or more application specific processors (ASICs), one or more field programmable logic arrays (FPGAs), or any combination thereof.

The local memory 20 and/or the main memory storage device 22 may be tangible, non-transitory, computer-readable mediums that store instructions executable by and data to be processed by the processor core complex 18. For example, the local memory 20 may include random access memory (RAM) and the main memory storage device 22 may include read only memory (ROM), rewritable non-volatile memory such as flash memory, hard drives, optical discs, and the like. By way of example, a computer program product containing the instructions may include an operating system or an application program.

Additionally, as depicted, the processor core complex 18 is operably coupled with the network interface 24. Using the network interface 24, the computing device 10 may communicatively couple to a network and/or other computing devices. For example, the network interface 24 may connect the computing device 10 to a personal area network (PAN), such as a Bluetooth network, a local area network (LAN), such as an 802.11x Wi-Fi network, and/or a wide area network (WAN), such as a 4G or LTE cellular network. In this manner, the network interface 24 may enable the computing device 10 to transmit encoded image data to a network and/or receive encoded image data from the network for display on the electronic display 12.

Furthermore, as depicted, the processor core complex 18 is operably coupled with I/O ports 16, which may enable the computing device 10 to interface with various other electronic devices. For example, a portable storage device may be connected to an I/O port 16, thereby enabling the processor core complex 18 to communicate data with a portable storage device. In this manner, the I/O ports 16 may enable the computing device 10 to output encoded image data to the portable storage device and/or receive encoded image data from the portable storage device.

As depicted, the processor core complex 18 is also operably coupled to the power source 26, which may provide power to the various components in the computing device 10. The power source 26 may include any suitable source of energy, such as a rechargeable lithium polymer (Li-poly) battery and/or an alternating current (AC) power converter. Furthermore, as depicted, the processor core complex 18 is operably coupled with input structures 14, which may enable a user to interact with the computing device 10. The inputs structures 14 may include buttons, keyboards, mice, trackpads, and the like. Additionally or alternatively, the electronic display 12 may include touch components that enable user inputs to the computing device 10 by detecting occurrence and/or position of an object touching its screen (e.g., surface of the electronic display 12).

In addition to enabling user inputs, the electronic display 12 may present visual representations of information by display image frames, such as a graphical user interface (GUI) of an operating system, an application interface, a still image, or video content. As described above, the electronic display 12 may display the image frames based on image data. In some embodiments, the image data may be received from other computing devices 10, for example, via the network interface 24 and/or the I/O ports 16. Additionally or alternatively, the image data may be generated by the computing device 10 using the image sensor 13. In some embodiments, image sensor 13 may digitally capture visual representations of proximate physical features as image data.

As described above, the image data may be encoded (e.g., compressed), for example by the computing device 10 that generated the image data, to reduce number of memory addresses used to store and/or bandwidth used to transmit the image data. Once generated or received, the encoded image data may be stored in local memory 20. Accordingly, to display image frames, the processor core complex 18 may retrieve encoded image data from local memory 20, decode the encoded image data, and instruct the electronic display 12 to display image frames based on the decoded image data.

Figure 2:
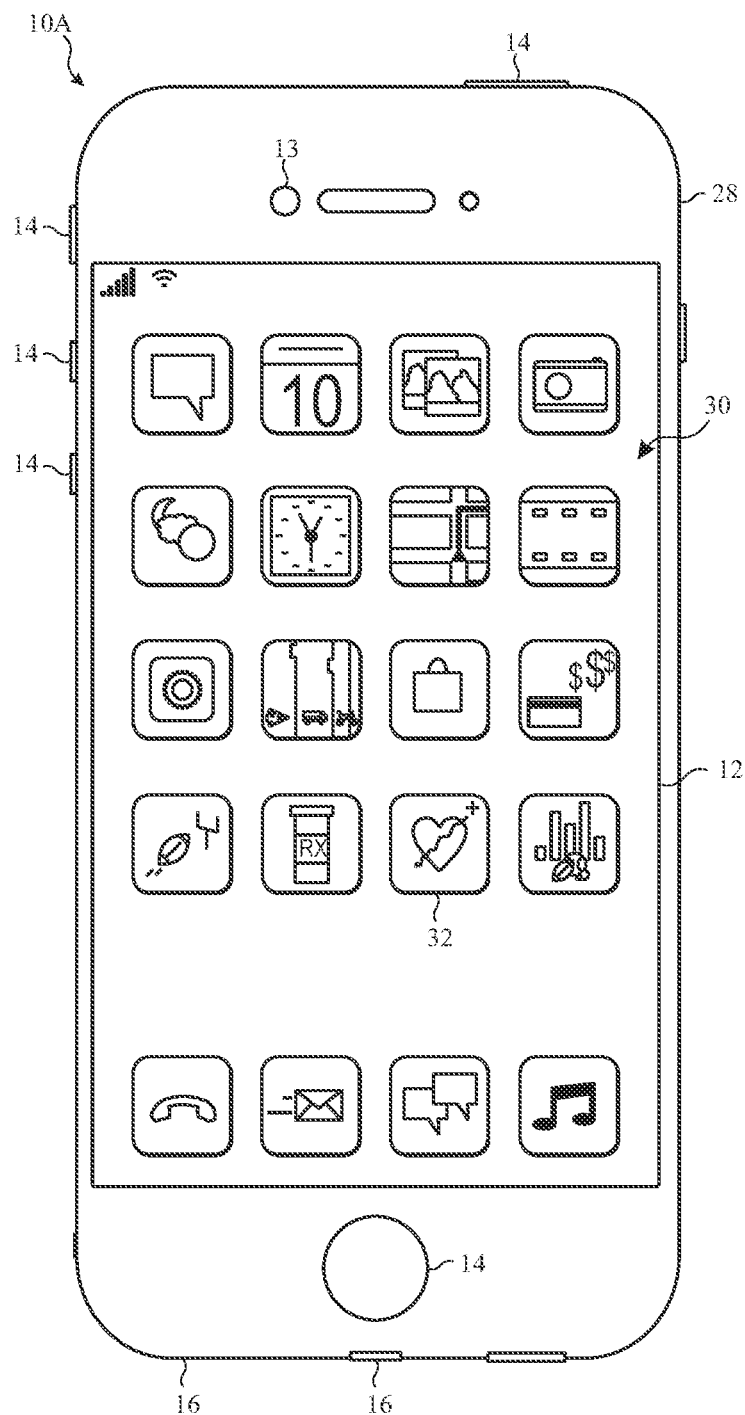
FIG. 2 is an example of the electronic device of FIG. 1, in accordance with an embodiment.

As described above, the computing device 10 may be any suitable electronic device. To help illustrate, one example of a handheld device 10A is described in FIG. 2, which may be a portable phone, a media player, a personal data organizer, a handheld game platform, or any combination of such devices. For example, the handheld device 10A may be a smart phone, such as any iPhone® model available from Apple Inc. As depicted, the handheld device 10A includes an enclosure 28, which may protect interior components from physical damage and/or shields them from electromagnetic interference. The enclosure 28 may surround the electronic display 12, which, in the depicted embodiment, displays a graphical user interface (GUI) 30 having an array of icons 32. By way of example, when an icon 32 is selected either by an input structure 14 or a touch component of the electronic display 12, an application program may launch.

Additionally, as depicted, input structures 14 open through the enclosure 28. As described above, the input structures 14 may enable user interaction with the handheld device 10A. For example, the input structures 14 may activate or deactivate the handheld device 10A, navigate a user interface to a home screen, navigate a user interface to a user-configurable application screen, activate a voice-recognition feature, provide volume control, and/or toggle between vibrate and ring modes. As depicted, I/O ports 16 also open through the enclosure 28. In some embodiments, the I/O ports 16 may include an audio jack to connect to external devices. Furthermore, as depicted, the image sensor 13 opens through the enclosure 28. In some embodiments, the image sensor 13 may include a digital camera that captures image data.

Figure 3:
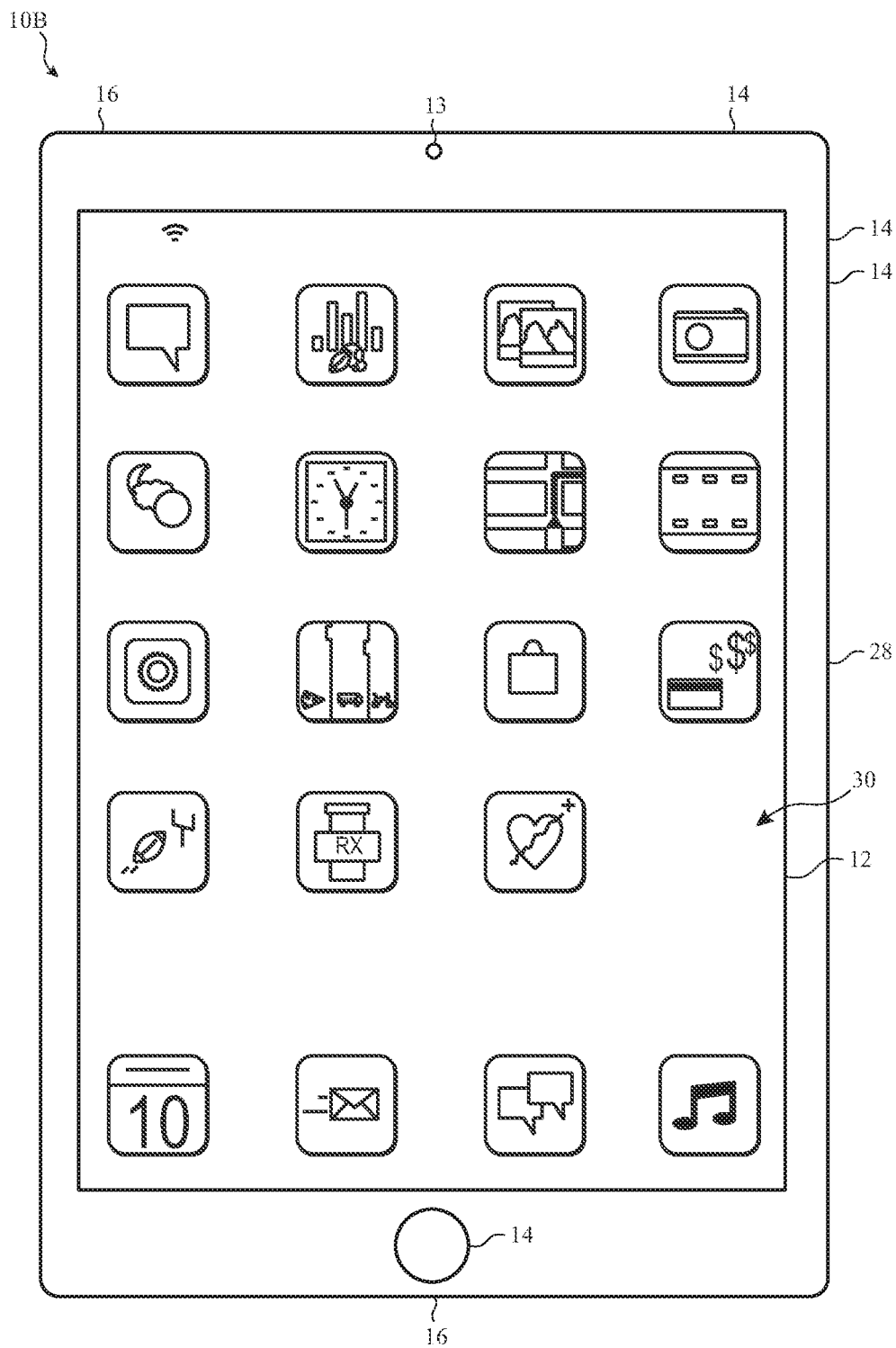
FIG. 3 is an example of the electronic device of FIG. 1, in accordance with an embodiment.
Figure 4:
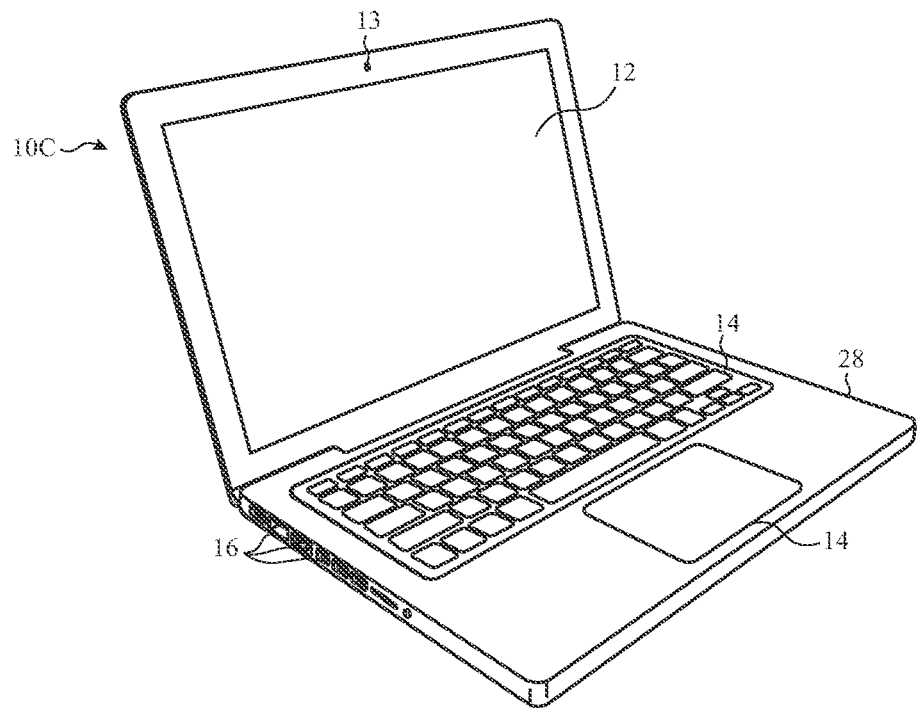
FIG. 4 is an example of the electronic device of FIG. 1, in accordance with an embodiment.
Figure 5:
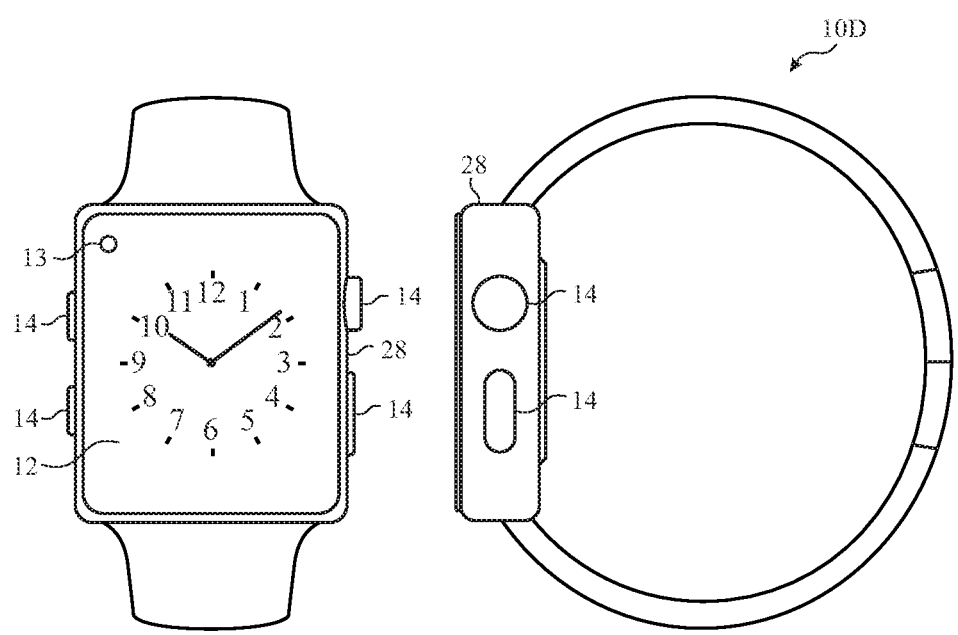
FIG. 5 is an example of the electronic device of FIG. 1, in accordance with an embodiment.

To further illustrate a suitable computing device 10, a tablet device 10B is described in FIG. 3. For example, the tablet device 10B may be any iPad® model available from Apple Inc. Additionally, in other embodiments, the computing device 10 may take the form of a computer 10C as described in FIG. 4. For example, the computer 10C may be any Macbook® or iMac® model available from Apple Inc. Furthermore, in other embodiments, the computing device 10 may take the form of a watch 10D as described in FIG. 5. For example, the watch 10D may be any Apple Watch® model available from Apple Inc. As depicted, the tablet device 10B, the computer 10C, and the watch 10D may each also include an electronic display 12, an image sensor 13, input structures 14, I/O ports 16, an enclosure 28, or any combination thereof.

As described above, source image data may be encoded (e.g., compressed) to reduce resource usage. Additionally, in some embodiments, the duration between generation of image data and display of image frames based on the image data may be limited to enable real-time or near real-time display and/or transmission of generated image frames. For example, image data captured by the image sensor 13 may be displayed on the electronic display 12 with minimal delay to enable a user to determine physical features proximate the image sensor 13 in real-time or near real-time. Additionally, image data generated by the computing device 10 (e.g., by the image sensor 13) may be transmitted (e.g., broadcast) to one or more other computing devices 10 to enable a real-time or near real-time streaming. To enable real-time or near real-time transmission and/or display, duration available to encode source image data may be limited, particularly as resolution of image frames and/or refresh rates of electronic displays 12 increase.

Figure 6:
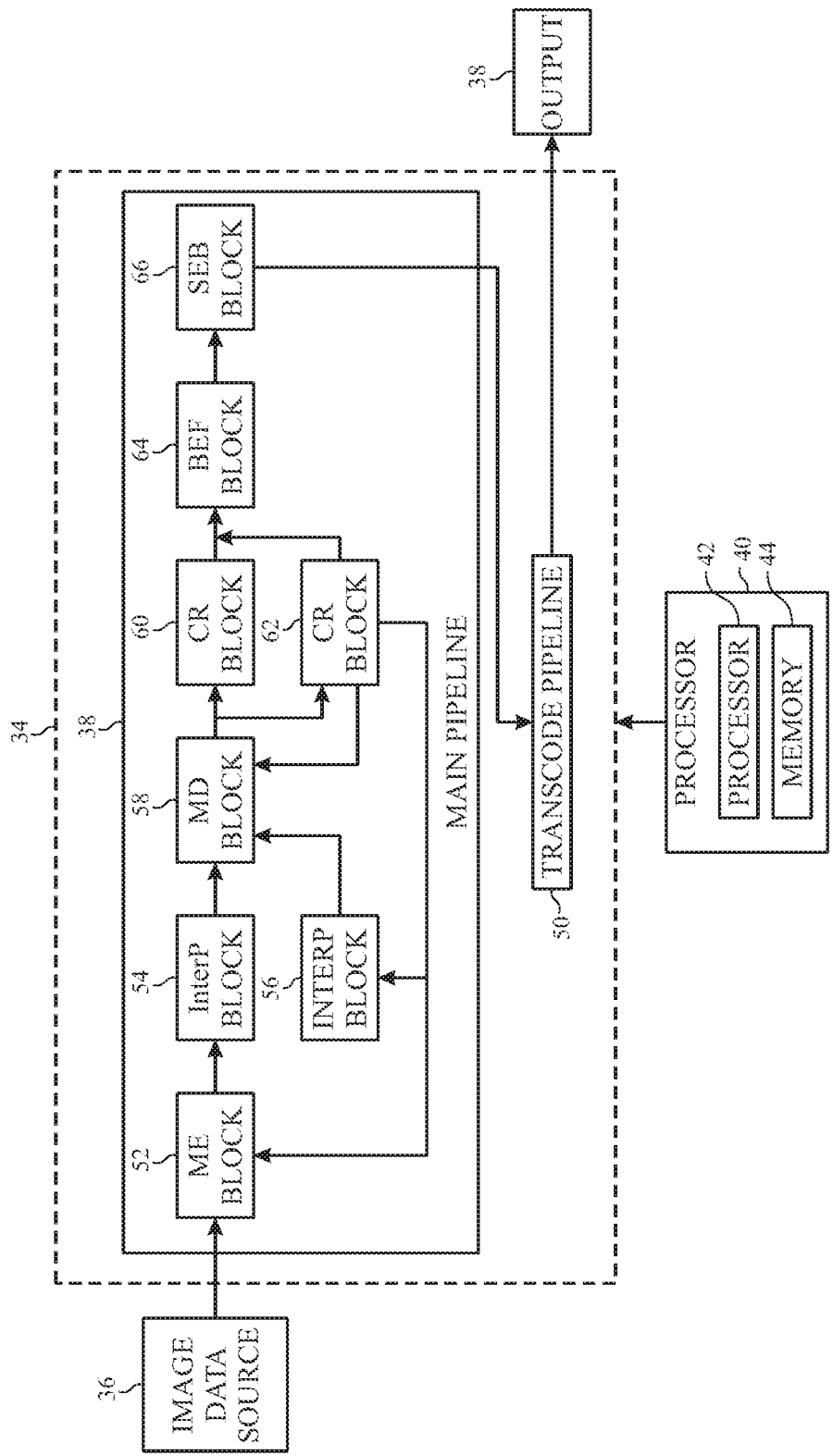
FIG. 6 is block diagram of a video encoding pipeline used to encode source image data, in accordance with an embodiment.

One embodiment of a video encoding pipeline 34 that may be used to encode source image data is described in FIG. 6. As depicted, the video encoding pipeline 34 is communicatively coupled to an image data source 36, an output 38, and a controller 40. In the depicted embodiment, the controller 40 may generally control operation of image data source 36, the video encoding pipeline 34, and the output 38. Although depicted as a single controller 40, in other embodiments, one or more separate controllers 40 may be used to control operation of the image data source 36, the video encoding pipeline 34, the output 38, or any combination thereof.

To facilitate controlling operation, the controller 40 may include a controller processor 42 and controller memory 44. In some embodiments, the controller processor 42 may execute instructions and/or process data stored in the controller memory 44 to control operation of the image data source 36, the video encoding pipeline 34, and/or the output 38. In other embodiments, the controller processor 42 may be hardwired with instructions that control operation in the image data source 36, the video encoding pipeline 34, and/or the output 38 when executed. Additionally, in some embodiments, the controller processor 42 may be included in the processor core complex 18 and/or separate processing circuitry (e.g., in the electronic display) and the controller memory 44 may be included in local memory 20, main memory storage device 22, and/or a separate, tangible, non-transitory computer-readable medium (e.g., in the electronic display).

As depicted, the video encoding pipeline 34 is communicatively coupled to the image data source 36. In this manner, the video encoding pipeline 34 may receive source image data from the image data source 36. Thus, in some embodiments, the image data source 36 may be the image sensor 13 and/or any other suitable device that generates source image data.

Additionally, as depicted, the video encoding pipeline 34 is communicatively coupled to the output 38. In this manner, the video encoding pipeline 34 may output encoded (e.g., compressed) image data to the output 38, for example, for storage and/or transmission. Thus, in some embodiments, the output 38 may include the local memory 20, the main memory storage device 22, the network interface 24, the I/O ports 16, the controller memory 44, or any combination thereof.

To facilitate generating encoded image data, the video encoding pipeline 34 may include multiple parallel pipelines. For example, in the depicted embodiment, the video encoding pipeline 34 includes a main pipeline 48 and a transcode pipeline 50. As will be described in more detail below, the main pipeline 48 may encode source image data using prediction techniques (e.g., inter-frame prediction techniques or intra-frame prediction techniques) and the transcode pipeline 50 may subsequently entropy encode syntax elements that indicate encoding parameters (e.g., quantization coefficients, inter-frame prediction modes, intra-frame prediction modes, and/or skip modes) used to encode the image data.

To facilitate prediction encoding source image data, the main pipeline 48 may perform various functions. To simplify discussion, the functions are divided between various blocks (e.g., circuitry or modules) in the main pipeline 48. In the depicted embodiment, the main pipeline 48 includes a motion estimation (ME) block 52, an inter-frame prediction (InterP) block 54, an intra-frame prediction (IntraP) block 56, a mode decision (MD) block 58, a chroma reconstruction (CR) block 60, a luma reconstruction (LR) block 62, a back-end-filter (BEF) block 64, and a syntax element binarization (SEB) block 66.

As depicted, the motion estimation block 52 is communicatively coupled to the image data source 36. In this manner, the motion estimation block 52 may receive source image data from the image data source 36, which may include a luma component (e.g., Y) and two chroma components (e.g., Cr and Cb). In some embodiments, the motion estimation block 52 may process one coding unit at a time. As used herein a "luma coding block" is intended to describe a luma component of a coding unit and a "chroma coding block" is intended to describe a chroma component of a coding unit. In other words, a coding unit may include a luma coding block per luma component and a chroma coding block per chroma component.

In some embodiments, the luma coding block may be the same resolution as the coding unit. On the other hand, the chroma coding blocks may vary in resolution based on chroma sampling format. For example, using a 4:4:4 sampling format, the chroma coding blocks may be the same resolution as the coding unit. However, the chroma coding blocks may be half (e.g., half resolution in the horizontal direction) the resolution of the coding unit when a 4:2:2 sampling format is used and a quarter the resolution (e.g., half resolution in the horizontal direction and half resolution in the vertical direction) of the coding unit when a 4:2:0 sampling format is used.

It should be appreciated that, while certain examples of particular coding units, prediction units, and transform units are described below, any suitable block sizes may be used. For example, while 16×16 or 32×32 coding units, prediction units, and transform units are discussed below, other sizes may be 64×64 or 128×128 or greater. Moreover, while the coding units, prediction units, and transform units are described as squares, other geometries may be used. For example, in other embodiments, the coding units, prediction units, and transform units may be 16×32 or 128×64.

As described above, a coding unit may include one or more prediction units, which each includes a luma prediction block per chroma component (e.g., Y) and a chroma prediction block per chroma component (e.g., Cr and Cb). Similar to the luma coding block, a luma prediction block may be the same resolution as the prediction unit. On the other hand, similar to the chroma coding blocks, a chroma prediction block may vary in resolution from the prediction unit based on chroma sampling format.

In some embodiments, the luma prediction block may be encoded using the same luma prediction mode and the chroma prediction block may be encoded using the same chroma prediction mode. Accordingly, in some embodiments, the prediction mode used to encode the luma prediction block and the chroma prediction blocks of a prediction unit may be separately determined. For example, in the depicted embodiment, the motion estimation block 52 may determine candidate luma inter-frame prediction modes that can be used to encode a luma prediction block. As described above, an inter-frame prediction mode may include a motion vector and a reference index to indicate location (e.g., spatial position and temporal position) of a reference sample relative to a prediction unit. More specifically, the reference index may indicate display order of a reference image frame corresponding with the reference sample relative to a current image frame corresponding with the prediction unit. Additionally, the motion vector may indicate position of the reference sample in the reference image frame relative to position of the prediction unit in the current image frame.

To determine a candidate luma inter-frame prediction mode, the motion estimation block 52 may search reconstructed luma image data of other image frames, which may be fed back from the luma reconstruction block 62. For example, the motion estimation block 52 may determine reference samples for a prediction unit by comparing its luma prediction block to the luma of reconstructed image data. In some embodiments, the motion estimation block 52 may determine how closely a prediction unit and a reference sample match based on a match metric. In some embodiments, the match metric may be the sum of absolute difference (SAD) between the luma prediction block and luma of the reference sample. Additionally or alternatively, the match metric may be the sum of absolute transformed difference (SATD) between the luma prediction block and the luma of the reference sample. When the match metric is above a match threshold, the motion estimation block 52 may determine that the reference sample and the prediction unit do not closely match. On the other hand, when the match metric is below the match threshold, the motion estimation block 52 may determine that the reference sample and the prediction unit are sufficiently similar.

After a reference sample that sufficiently matches the prediction unit is determined, the motion estimation block 52 may determine location of the reference sample relative to the prediction unit. For example, the motion estimation block 52 may determine a reference index to indicate a reference image frame, which contains the reference sample, relative to a current image frame, which contains the prediction unit. Additionally, the motion estimation block 52 may determine a motion vector to indicate position of the reference sample in the reference frame relative to position of the prediction unit in the current frame. In some embodiments, the motion vector may be expressed as (mvX, mvY), where mvX is horizontal offset and mvY is a vertical offset between the prediction unit and the reference sample.

In this manner, the motion estimation block 52 may determine candidate luma inter-frame prediction modes (e.g., reference index and motion vector) for one or more luma prediction blocks in the coding unit. The motion estimation block 52 may then input candidate luma inter-frame prediction modes to the inter-frame prediction block 54. Based at least in part on the candidate luma inter-frame prediction modes, the inter-frame prediction block 54 may determine luma prediction samples.

In some embodiments, the inter-frame prediction block 54 may determine a luma prediction sample by applying motion compensation to a reference sample indicated by a candidate inter-frame prediction mode. For example, the inter-frame prediction block 54 may apply motion compensation by determining luma of the reference sample at fractional (e.g., quarter or half) pixel positions. The inter-frame prediction block 54 may then input the luma prediction sample and corresponding candidate luma inter-frame prediction mode to the mode decision block 58 for consideration. In some embodiments, the inter-frame prediction block 54 may sort the candidate luma inter-frame prediction modes based on associated mode cost and input only a specific number to the mode decision block 58.

In addition to the candidate inter-frame prediction modes, the mode decision block 58 may consider one or more candidate luma intra-frame predictions modes and/or a skip mode. In some embodiments, the skip mode may skip determining and encoding prediction residuals. Additionally, in some embodiments, the main pipeline 48 may be capable of using multiple (e.g., 17 or 35) different intra-frame prediction modes. In the depicted embodiment, the intra-frame prediction block 56 may determine the candidate luma intra-frame prediction modes from the multiple possible intra-frame prediction modes.

Additionally, the intra-frame prediction block 56 may determine a luma prediction sample corresponding with each candidate luma intra-frame prediction mode. In some embodiments, the intra-frame prediction block 56 may determine a luma prediction sample by applying the candidate luma intra-frame prediction mode based on neighboring (e.g., top, top right, left, or bottom left) reconstructed luma image data. For example, utilizing a vertical prediction mode, the intra-frame prediction block 56 may set each column of a luma prediction sample equal to reconstructed luma image data of a pixel directly above the column. Additionally, utilizing a DC prediction mode, the intra-frame prediction block 45 may set a luma prediction sample equal to an average of reconstructed luma image data of pixels adjacent the luma prediction block. The intra-frame prediction block 56 may then input candidate luma intra-frame prediction modes and corresponding luma prediction samples to the mode decision block 58 for consideration. In some embodiments, the intra-frame prediction block 56 may sort the candidate luma intra-frame prediction modes based on associated mode cost and input only a specific number to the mode decision block 58.

The mode decision block 58 may determine encoding parameters used to encode the source image data (e.g., coding block). In some embodiments, the encoding parameters for a coding block may include prediction technique (e.g., intra-prediction techniques or inter-frame prediction techniques) for the coding block, number of prediction units in the coding block, size of the prediction units, luma prediction mode (e.g., intra-prediction modes or inter-frame prediction modes) for each of the luma prediction blocks, number of transform units in the coding block, size of the transform units, whether to split the coding unit into smaller coding units, or any combination thereof.

To facilitate determining the encoding parameters, the mode decision block 58 may determine whether the image frame is an I-frame, a P-frame, or a B-frame. In I-frames, source image data is encoded only by referencing other image data used to display the same image frame. Accordingly, when the image frame is an I-frame, the mode decision block 58 may determine that each coding unit in the image frame may be prediction encoded using intra-frame prediction techniques.

On the other hand, in a P-frame or B-frame, source image data may be encoded by referencing image data used to display the same image frame and/or a different image frames. More specifically, in a P-frame and in a B-frame, source image data may be encoded by referencing image data used to display previous image frames and/or image data used to display subsequent image frames. Accordingly, when the image frame is a P-frame or a B-frame, the mode decision block 58 may determine that each coding unit in the image frame may be prediction encoded using either intra-frame techniques or inter-frame techniques.

Although using the same prediction technique, the configuration of luma prediction blocks in a coding unit may vary. For example, the coding unit may include a variable number of prediction units, which each uses different prediction modes, at variable locations in the coding unit. Thus, in some embodiments, the mode decision block may evaluate multiple candidate prediction mode configurations. As used herein a "prediction mode configuration" is intended to describe number, size, and location of prediction units; number, size, and location of transform units; and prediction mode of luma prediction blocks in a coding unit. Thus, the mode decision block 58 may determine a candidate luma inter-frame prediction mode configuration using one or more of the candidate luma inter-frame prediction modes received from the inter-frame prediction block 54. Additionally, the mode decision block 58 may determine a candidate luma intra-frame prediction mode configuration using one or more of the candidate luma intra-frame prediction modes received from the intra-frame prediction block 56.

Since a coding block may utilize the same prediction technique, the mode decision block 58 may determine a prediction technique for a coding unit by comparing rate-distortion cost associated with the candidate luma prediction mode configurations and/or the skip mode. In some embodiments, the rate-distortion cost may be as follows:

$$RD = A(\text{rate\_cost}) + B(\text{distortion\_cost}) \quad (1)$$

where RD is the rate-distortion cost, rate_cost is an estimated rate (e.g. number of bits), distortion_cost is a distortion metric (e.g., sum of squared difference), A is a weighting factor for the estimated rate, and B is a weighting factor for the distortion metric.

In some embodiments, the distortion metric may indicate amount of expected distortion in decoded image data when a candidate luma prediction mode configuration is implemented. Accordingly, in some embodiments, the distortion metric may be a sum of squared difference (SSD) between source luma image data and a corresponding reconstructed luma image data, which may be fed back from the luma reconstruction block 62. As described above, the reconstructed luma image data may indicate decoded image data expected to be determined by a decoding device.

Additionally, in some embodiments, the estimated rate may be number of bits expected to be used to indicate a candidate prediction mode configuration. For example, the estimated rate of an intra-frame prediction mode configuration may include expected number of bits used to indicate the intra-frame prediction technique (e.g., coding unit overhead), the luma intra-frame prediction modes, luma prediction residuals, and/or a transform unit split. On the other hand, the estimated rate for an inter-frame prediction mode configuration may include expected number of bits used to indicate the inter-frame prediction technique, a motion vector (e.g., motion vector difference), and/or a transform unit split. Additionally, the estimated rate of the skip mode may include number of bits expected to be used to indicate the coding unit by reference to a neighboring prediction mode (e.g., motion vector).

In embodiments where the rate-distortion cost of equation (1) is used, the mode decision block 58 may select a luma prediction mode configuration or skip mode with the lowest associated rate-distortion cost for the coding unit. In this manner, the mode decision block 58 may determine encoding parameters, such as prediction technique for the coding unit, number of prediction units in the coding unit, size of the prediction units, location of the prediction units, luma prediction mode for each of the prediction units, luma prediction residuals for each of the prediction units, number of transform units in each of the prediction units, size of the transform units, location of the transform units, whether to split the coding unit into smaller coding units, or any combination thereof.

To improve quality of decoded image data, the main pipeline 48 may then mirror decoding of encoded image data. To facilitate, the mode decision block 58 may output the encoding parameters to the chroma reconstruction block 60 and the luma reconstruction block 62. Based at least in part on encoding parameters, the luma reconstruction block 62 may determine a reconstructed luma sample of the coding unit and the chroma reconstruction block 60 may determine a reconstructed chroma sample of the coding unit.

To facilitate, the luma reconstruction block 62 may determine luma encoding parameters used to generate the reconstructed luma sample. In some embodiments, the luma encoding parameters may include number of luma prediction blocks in the coding unit, location of the luma prediction blocks, size of the luma prediction blocks, luma prediction modes, luma prediction residuals, number of luma transform blocks in each luma prediction block, size of the luma transform blocks, location of the luma transform blocks, or any combination thereof. In such embodiments, the luma reconstruction block 62 may receive the luma prediction modes and the luma prediction residuals from the mode decision block 58. Additionally, the luma reconstruction block 62 may set number, size, and/or location of the luma prediction blocks equal to number, size, and/or location of the prediction units. Furthermore, the luma reconstruction block 62 may set number, size, and/or location of the luma transform blocks equal to number, size, and/or location of the transform units.

To determine the reconstructed luma sample of a luma transform block, the luma reconstruction block 62 may apply a luma prediction mode of a luma prediction block that includes the luma transform block to determine a luma prediction sample. The luma reconstruction block 62 may then subtract the luma prediction sample from source image data corresponding with the luma transform block to determine a luma prediction residual. Additionally, the luma reconstruction block 62 may perform a forward transform and/or forward quantization (FTQ) on the luma prediction residual to determine an encoded luma prediction residual and perform an inverse transform and/or inverse quantization (ITQ) on the encoded luma prediction residual to determine a reconstructed luma prediction residual, which indicates a decoded luma prediction residual expected to be determined by a decoding device. In some embodiments, the luma reconstruction block 62 may skip performing the forward transform and the inverse transform, for example, when performing the transforms is not expected to improve compression efficiency (e.g., bits used to indicate a prediction residual).

The luma reconstruction block 62 may then add the reconstructed luma prediction residual to the luma prediction sample to determine the reconstructed luma sample of the transform block, which indicates a decoded luma image data expected to be determined by the decoding device. In this manner, the luma reconstruction block 62 may determine a reconstructed luma sample of each luma transform block in the coding unit and, thus, a reconstructed luma sample of the coding unit, which may be output to the to the back-end-filter block 64.

On the other hand, the chroma reconstruction block 60 may determine chroma encoding parameters used to generate the reconstructed chroma (e.g., Cr and Cb) samples. In some embodiments, the chroma encoding parameters may include number of chroma prediction blocks in the coding unit, location of the chroma prediction blocks, size of the chroma prediction blocks, chroma prediction modes, chroma prediction residuals, number of chroma transform blocks in each chroma prediction block, size of the chroma transform blocks, location of the chroma transform blocks, or any combination thereof.

Additionally, in some embodiments, the chroma reconstruction block 60 may determine number, size and/or location of the chroma transform blocks based at least in part on chroma sampling format. For example, when using a 4:4:4 sampling format, the luma and chroma components are sampled at the same resolution. As such, the chroma reconstruction block 60 may set number, size and/or location of the chroma transform blocks per component equal to number, size and/or location of the transform units. However, when the luma and chroma are sampled at different resolutions (e.g., 4:2:2 or 4:2:0), the chroma reconstruction block 60 may set the number, size and/or location of the chroma prediction blocks per component equal to a scaled version of the number, size and/or location of the prediction units. For example, when the 4:2:2 sampling format is used, the chroma reconstruction block 60 may scale the size of the prediction units in half horizontally to determine the size of the chroma prediction blocks. Additionally, when the 4:2:0 sampling format is used, the chroma reconstruction block 60 may scale the size of the prediction units in half vertically and horizontally to determine size of the chroma prediction blocks.

Furthermore, the chroma reconstruction block 60 may determine the chroma prediction modes and, thus, the chroma prediction residuals based at least in part on the prediction technique of the coding unit and/or the luma prediction modes. For example, when an inter-frame prediction technique is selected, the chroma reconstruction block 60 may set the chroma inter-frame prediction mode used to encode a chroma prediction block equal to the luma inter-frame prediction mode used to encode a co-located luma prediction block. In other words, when an inter-frame prediction technique is selected for the coding unit, evaluation of multiple candidate chroma inter-frame prediction modes may be obviated, thereby facilitating reduction in operating duration of the main pipeline 48.

However, when an intra-frame prediction technique is selected, the chroma reconstruction block 60 may evaluate multiple candidate chroma intra-frame prediction modes to facilitate reducing distortion in decoded image data. As will be described in more detail below, the chroma reconstruction block 60 may select a chroma intra-frame prediction mode used to encode a chroma prediction block based at least in part on expected resulting distortion.

To determine the reconstructed chroma sample of a chroma transform block, the chroma reconstruction block 60 may apply a chroma prediction mode of a chroma prediction block that includes the chroma transform block to determine a chroma prediction sample. The chroma reconstruction block 60 may then subtract the chroma prediction sample from source image data corresponding with the chroma transform block to determine a chroma prediction residual. Additionally, the chroma reconstruction block 60 may perform a forward transform and/or forward quantization (FTQ) on the chroma prediction residual to determine an encoded chroma prediction residual and perform an inverse transform and/or inverse quantization (ITQ) on the encoded chroma prediction residual to determine a reconstructed chroma prediction residual, which indicates a decoded chroma prediction residual expected to be determined by a decoding device.

In some embodiments, the chroma reconstruction block 60 may skip performing the transforms (e.g., forward transform and inverse transform) on the chroma prediction residual. For example, as will be described in more detail below, the chroma reconstruction block 60 may skip the transforms based at least in part on the effect that performing the transforms is expected to have on compression efficiency (e.g., bits used to indicate a prediction residual). In some embodiments, the chroma reconstruction block 60 may determine expected effect based at least in part on gradient of the corresponding luma component. Additionally, in some embodiments, the chroma reconstruction block 60 may skip the transforms based on number of luma transform blocks in the prediction unit that skip the transforms, number of neighboring luma transform blocks that skip the transforms, and/or number of neighboring chroma transform blocks that skip the transforms.

The chroma reconstruction block 60 may then add the reconstructed chroma prediction residual to the chroma prediction sample to determine the reconstructed chroma sample of the chroma transform block, which indicates decoded chroma image data expected to be determined by the decoding device. In this manner, the chroma reconstruction block 60 may determine a reconstructed chroma sample of each chroma transform block in the coding unit and, thus, a reconstructed chroma sample of the coding unit, which may be output to the to the back-end-filter block 64. Additionally, in some embodiments, reconstructed chroma samples may be stored, for example, to enable the chroma reconstruction block 60 to determine reconstructed samples of subsequently processed coding units.

To improve the quality of decoded image data, the back-end-filter block 64 may filter the reconstructed image data (e.g., reconstructed chroma sample and/or reconstructed luma sample). In some embodiments, the back-end-filter block 64 may perform deblocking and/or sample adaptive offset (SAO) functions. For example, the back-end-filter block 64 may perform deblocking on the reconstructed image data to reduce the perceivability of blocking artifacts that may be introduced. Additionally, the back-end-filter block 64 may perform a sample adapt offset function by adding offsets to portions of the reconstructed image data.

To enable decoding, encoding parameters used to generate encoded image data may be communicated to a decoding device. In some embodiments, the encoding parameters may include the encoding parameters determined by the mode decision block 58 (e.g., prediction unit configuration and/or transform unit configuration), luma encoding parameters determined by the luma reconstruction block 62, chroma encoding parameters determined by the chroma reconstruction block 60, and/or encoding parameters used by the back-end-filter block 64. To facilitate communication, the encoding parameters may be expressed as syntax elements. For example, a first syntax element may indicate a prediction mode (e.g., inter-frame prediction mode or intra-frame prediction mode), a second syntax element may indicate a quantization coefficient, a third syntax element may indicate configuration of prediction units, and a fourth syntax element may indicate configuration of transform units.

In some embodiments, resources used to store and/or communicate the encoding parameters may be reduced using entropy encoding, such as context adaptive binary arithmetic coding (CABAC) and/or context-adaptive variable-length coding (CAVLC). To facilitate, the syntax element binarization block 66 may receive encoding parameters expressed as syntax elements from the mode decision block 58, the luma reconstruction block 62, the chroma reconstruction block 60, and/or the back-end-filter block 64. The syntax element binarization block 66 may then binarize a syntax element by mapping the syntax element to a corresponding binary symbol, which includes one or more bins (e.g., "0" or "1"). In some embodiments, the syntax element binarization block 66 may generated the binary symbol using exp-golomb, fixed length, truncated unary, truncated rice, or any combination thereof. In this manner, the syntax element binarization block 66 may generate a bin stream, which is supplied to the transcode pipeline 50.

The transcode pipeline 50 may then convert the bin stream to a bit stream with one or more syntax elements represented by a fractional number of bits. In some embodiments, the transcode pipeline 50 may compress bins from the bin stream into bits using arithmetic coding. To facilitate arithmetic coding, the transcode pipeline 50 may determine a context model for a bin, which indicates probability of the bin being a "1" or "0," based on previous bins. Based on the probability of the bin, the transcode pipeline 50 may divide a range into two sub-ranges. The transcode pipeline 50 may then determine an encoded bit such that it falls within one of two sub-ranges to select the actual value of the bin. In this manner, multiple bins may be represented by a single bit, thereby improving encoding efficiency (e.g., reduction in size of source image data). After entropy encoding, the transcode pipeline 50, may transmit the encoded image data to the output 38 for transmission, storage, and/or display.

As described above, the duration provided for encoding image data may be limited, particularly to enable real-time or near real-time display and/or transmission. Thus, to enable real-time or near real-time display and/or transmission, operational efficiency of the main pipeline 48 may be improved, for example, by reducing operating duration of the chroma reconstruction block 60. In some embodiments, operating duration of the chroma reconstruction block 60 may be reduced by reducing number of forward transforms, forward quantizations, inverse quantizations, and/or inverse transform performed.

Figure 7:
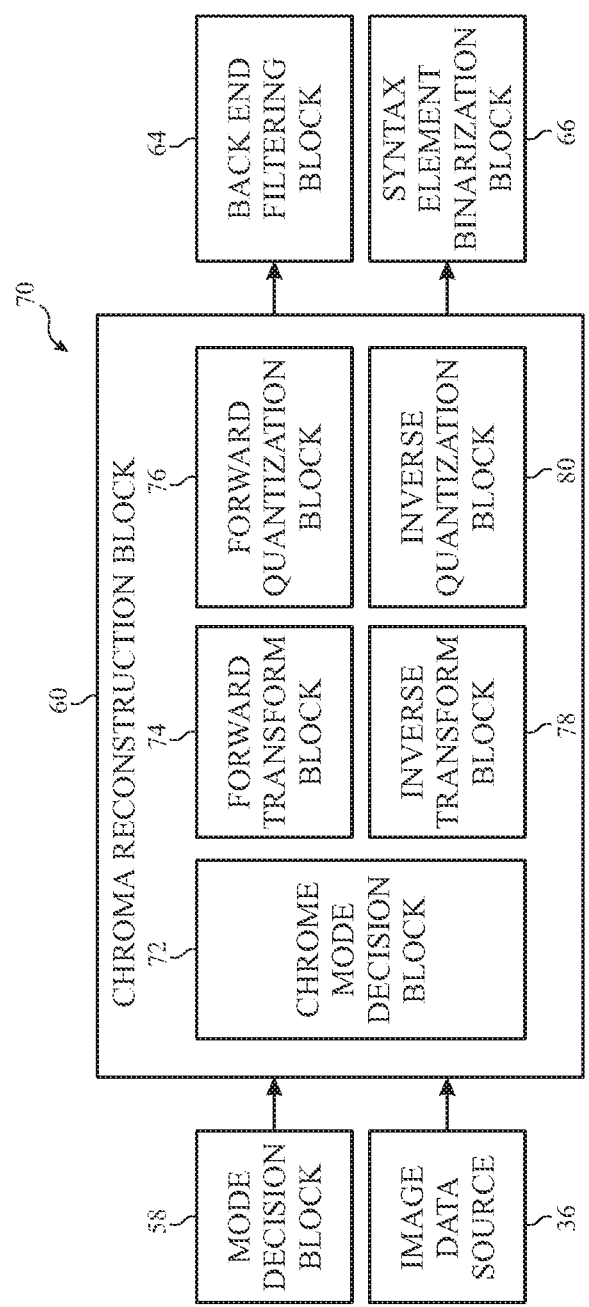
FIG. 7 is block diagram of a portion of the video encoding pipeline of FIG. 6 including a chroma reconstruction block, in accordance with an embodiment.

To help illustrate, the image data source 36 and a portion 70 of the video encoding pipeline 34, which includes the chroma reconstruction block 60, the mode decision block 58, the back-end-filtering block 64, and the syntax element binarization block 66, are described in FIG. 7. As depicted, the chroma reconstruction block 60 includes a chroma mode decision block 72, a forward transform block 74, a forward quantization block 76, an inverse transform block 78, and an inverse quantization block 80.

In the depicted embodiment, the chroma mode decision block 72 may determine chroma encoding parameters used to encode the chroma components of a coding unit. As described above, in some embodiments, the chroma encoding parameters may include number of chroma prediction blocks in the coding unit, location of the chroma prediction blocks, size of the chroma prediction blocks, chroma prediction modes, chroma prediction residuals, number of chroma transform blocks in each chroma prediction block, size of the chroma transform blocks, location of the chroma transform blocks, or any combination thereof. Additionally, as described above, the chroma encoding parameters may be determined based at least in part on a chroma sampling mode (e.g., 4:4:4, 4:2:2, or 4:2:0) and encoding parameters determined by the mode decision block 58. Accordingly, in such embodiments, the chroma mode decision block 72 may receive encoding parameters from the mode decision block 58.

Additionally, as described above, the chroma reconstruction block 60 may evaluate multiple candidate chroma intra-frame prediction modes when the coding unit utilizes an intra-frame prediction technique. In some embodiments, the chroma mode decision block 72 may select a chroma intra-frame prediction mode based on expected distortion (e.g., difference) between source image data and a corresponding chroma prediction sample. Accordingly, in such embodiments, the chroma mode decision block 72 may receive source chroma image data from the image data source 36 and/or the mode decision block 58.

Additionally, as described above, the chroma reconstruction block 60 may generate reconstructed chroma image data by performing a forward transform, a forward quantization, an inverse quantization, and/or an inverse transform on a chroma prediction residual to generate a reconstructed chroma prediction residual and by applying the reconstructed chroma prediction residual to a chroma prediction sample. In the depicted embodiment, the forward transform block 74 may perform forward transforms, the forward quantization block 76 may perform forward quantizations, the inverse transform block 78 may perform inverse transforms, and the inverse quantization block 80 may perform inverse quantizations.

Furthermore, as described above, the back-end-filter block 64 may filter the reconstructed image data. Accordingly, the chroma reconstruction block 60 may transmit the reconstructed chroma samples to the back-end-filter block 64. Additionally, as described above, encoding parameters used to generate encoded image data may be entropy encoded by the syntax element binarization block 66. Accordingly, the chroma reconstruction block 60 may transmit the chroma encoding parameters determined by the chroma mode decision block 72 and/or quantization coefficients used by the forward quantization block 76 to the syntax element binarization block 66.

Figure 8:
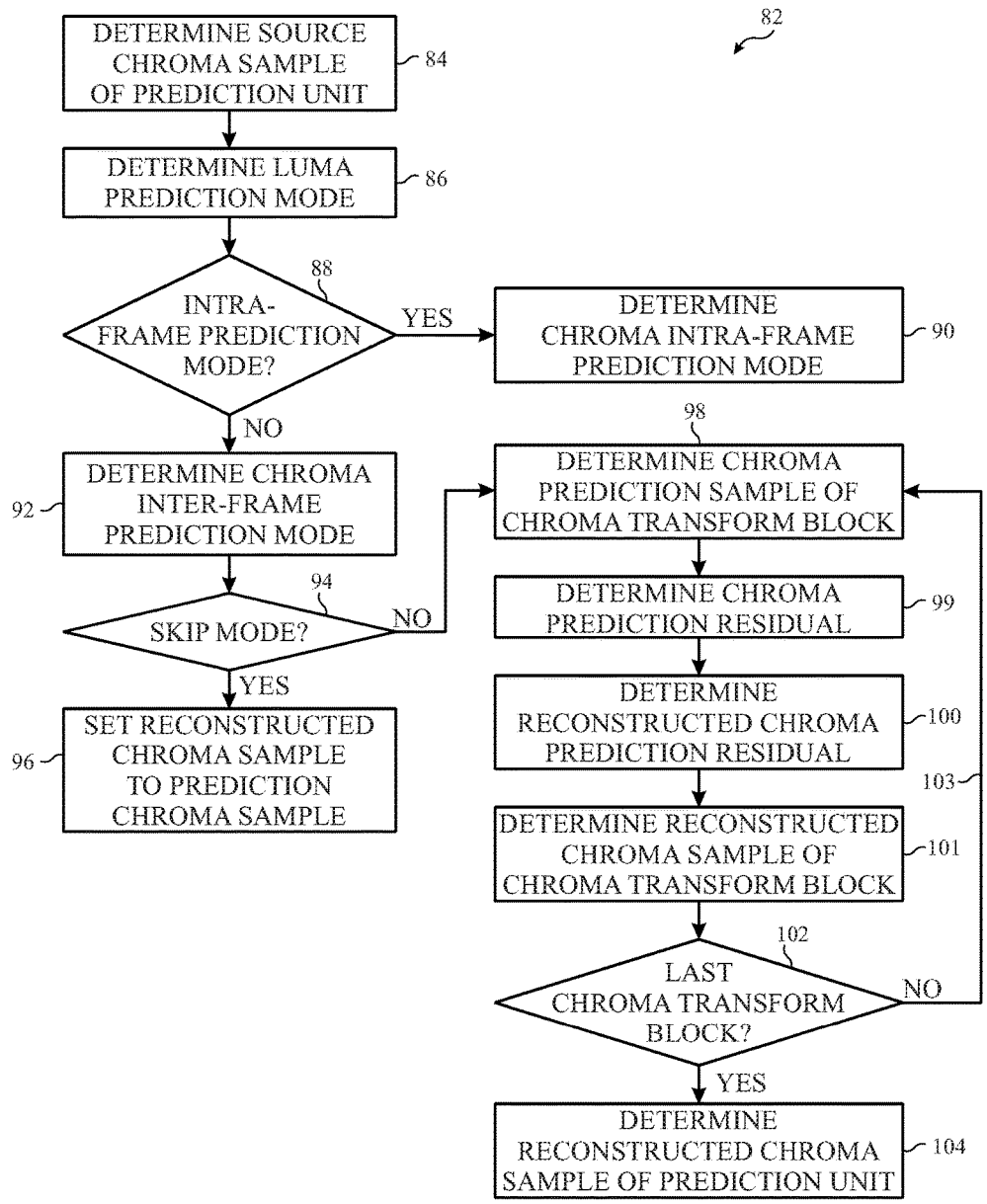
FIG. 8 is a flow diagram of a process for operating the chroma reconstruction block of FIG. 7, in accordance with an embodiment.

One embodiment of a process 82 describing operation of the chroma reconstruction block 60 is presented in FIG. 8. Generally, the process 82 includes determining a source chroma sample of a prediction unit (process block 84), determining a luma prediction mode (process block 86), whether the luma prediction mode is an intra-frame prediction mode (decision block 88), and determining a chroma intra-frame prediction mode when the luma prediction mode is an intra-frame prediction mode (process block 90). When not an intra-frame prediction mode, the process 82 includes determining a chroma inter-frame prediction mode (process block 92), determining whether the chroma inter-frame prediction mode is a skip mode (decision block 94), and setting a reconstructed chroma sample to the prediction chroma sample when the luma prediction mode is a skip mode (process block 96). When not a skip mode and/or when the chroma intra-frame prediction mode is determined, the process 82 includes determining a chroma prediction sample of a chroma transform block (process block 98), determining a chroma prediction residual (process block 99), determining a reconstructed chroma prediction residual (process block 100), determining a reconstructed chroma sample of the chroma transform block (process block 101), determining whether the chroma transform block is a last chroma transform block of the prediction unit (decision block 102), and determining a reconstructed chroma sample of the prediction unit (process block 104). In some embodiments, the process 82 may be implemented by executing instructions stored in a tangible, non-transitory, computer-readable medium, such as the controller memory 44, the local memory 20, the main memory storage device 22, or the like, using processing circuitry, such as the controller processor 42, the processor core complex 18, a graphics processing unit (GPU), or the like.

Accordingly, in some embodiments, the controller 40 may use the chroma reconstruction block 60 to determine a source chroma sample (e.g., image data) of a coding unit (process block 84). The chroma reconstruction block 60 may determine the source chroma sample based on source image data. Thus, in some embodiments, the chroma reconstruction block 60 may receive the source image data from the mode decision block 58 and/or from the image data source 36.

Based on the source image data, the chroma reconstruction block 60 may determine the source chroma sample by sampling a chroma component (e.g., Cr or Cb) of the source image data. As described above, the chroma component may be sampled at various resolutions. For example, using 4:4:4 chroma sampling, the chroma reconstruction block 60 may determine the source chroma sample at the same resolution as a co-located source luma sample. Additionally, using 4:2:2 chroma sampling, the chroma reconstruction block 60 may determine the source chroma sample with the same vertical resolution as the co-located source luma sample, but half the horizontal resolution. Furthermore, using 4:2:0 chroma sampling, the chroma reconstruction block 60 may determine the source chroma sample with half the horizontal resolution and half the vertical resolution as the co-located source luma sample.

Additionally, the controller 40 may use the chroma reconstruction block 60 to determine (e.g., receive) a luma prediction mode to be used to encode a luma prediction block in the coding unit (process block 86). As described above, the luma prediction modes may be determined by the mode decision block 58. Accordingly, the chroma reconstruction block 60 may receive the luma prediction modes from the mode decision block 58.

Once received, the controller 40 may use the chroma reconstruction block 60 to determine whether the luma prediction mode includes an intra-frame prediction mode (process block 88). As described above, source image data may be predicted using inter-frame prediction modes or intra-frame prediction modes. Thus, when an intra-frame prediction mode is not included, the chroma reconstruction block 60 may determine that the luma prediction mode is a luma inter-frame prediction mode and, thus, the coding unit is encoded using an inter-frame prediction technique.

Accordingly, when the luma prediction mode includes an inter-frame prediction mode, the controller 40 may use the chroma reconstruction block 60 to determine a chroma inter-frame prediction mode used to encode a co-located chroma prediction block in the coding unit (process block 92). As described above, in some embodiments, a co-located luma prediction block and chroma prediction block may use the same inter-frame prediction mode. Thus, in such embodiments, the chroma reconstruction block 60 may set the chroma inter-frame prediction mode used to encode the chroma prediction block equal to the luma inter-frame prediction mode used to encode the luma prediction block.

Additionally, when a chroma inter-frame prediction mode is selected, the controller 40 may use the chroma reconstruction block 60 to determine whether the chroma inter-frame prediction mode is a skip mode (decision block 94). When a skip mode, the video encoding pipeline 34 may use a neighboring inter-frame prediction mode and skip determining a prediction residual. As such, the chroma reconstruction block 60 may apply the neighboring chroma inter-frame prediction mode to determine a prediction chroma sample. The controller 40 may then use the chroma reconstruction block 60 to set a reconstructed chroma sample of the prediction unit to the prediction chroma sample (process block 96).

On the other hand, when the luma prediction mode includes an intra-frame prediction mode, the controller 40 may use the chroma reconstruction block 60 to determine that the coding unit is encoded using an intra-frame prediction technique and, thus, determine a chroma intra-frame prediction mode used to encode the co-located chroma prediction block (process block 90). As described above, in some embodiments, a co-located luma prediction block and chroma prediction block may use different intra-frame prediction modes. Accordingly, in such embodiments, the chroma reconstruction block 60 may evaluate multiple candidate chroma intra-frame prediction modes that can be used to encode the chroma prediction block.

Figure 9:
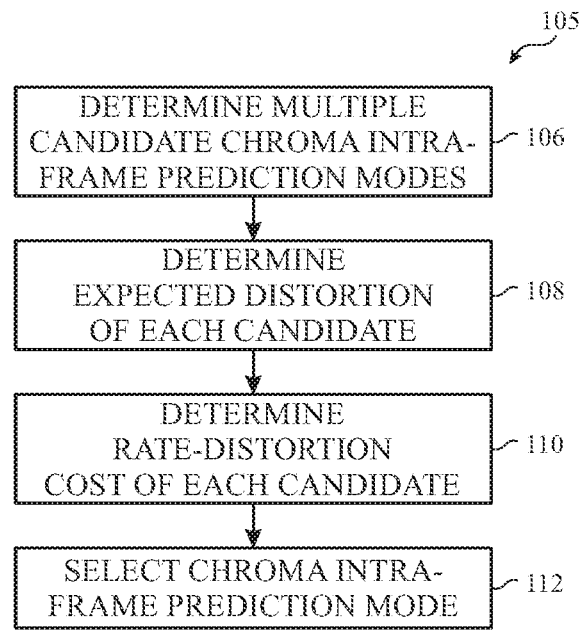
FIG. 9 is a flow diagram of a process for selecting an intra-frame prediction mode used by the chroma reconstruction block of FIG. 7, in accordance with an embodiment.

To help illustrate, one embodiment of a process 105 for evaluating multiple candidate chroma intra-frame prediction modes is described in FIG. 9. Generally, the process 105 includes determining multiple candidate chroma intra-frame prediction modes (process block 106), determining expected distortion of each candidate chroma intra-frame prediction mode (process block 108), determining rate-distortion cost of each candidate chroma intra-frame prediction mode (process block 110), and selecting a chroma intra-frame prediction mode (process block 112). In some embodiments, the process 105 may be implemented by executing instructions stored in a tangible, non-transitory, computer-readable medium, such as the controller memory 44, the local memory 20, the main memory storage device 22, or the like, using processing circuitry, such as the controller processor 42, the processor core complex 18, a graphics processing unit (GPU), or the like.

Accordingly, in some embodiments, the controller 40 may use the chroma reconstruction block 60 to determine multiple candidate chroma intra-frame prediction modes that can be used to encode a chroma prediction block in a coding unit (process block 106). As described above, the chroma reconstruction block 60 may be capable of using various intra-frame prediction modes. For example, when using the Advanced Video Coding (AVC) format, seventeen different intra-frame prediction modes may be used. Additionally, when using the High Efficiency Video Coding (HEVC) format, thirty-five different intra-frame prediction modes may be used. Thus, chroma reconstruction block 60 may determine the candidate chroma intra-frame prediction modes based on possible intra-frame prediction modes for the encoding format.

In some embodiments, the chroma reconstruction block 60 may include each possible intra-frame prediction mode as a candidate intra-frame prediction mode. However, this may result in a large number of candidate intra-frame prediction modes to evaluate, which may increase operating duration of the chroma reconstruction block 60. Accordingly, in other embodiments, the chroma reconstruction block 60 may select a subset of possible intra-frame prediction modes as candidate chroma intra-frame prediction modes, for example, based on likelihood that the chroma intra-frame prediction mode would be selected by the chroma mode decision block 72. To facilitate, in some embodiments, the chroma reconstruction block 60 may determine the candidate chroma intra-frame prediction modes based for chroma intra-frame prediction mode for a neighboring chroma prediction block.

Additionally, in some embodiments, the chroma reconstruction block 60 may determine the candidate chroma intra-frame prediction modes based on luma intra-frame prediction mode for the co-located luma prediction block. In fact, in some embodiments, number of candidate chroma intra-frame prediction modes may be fewer than number of candidate luma intra-frame prediction modes. For example, the candidate chroma intra-frame prediction modes may include the luma intra-frame prediction mode and four other standard specified candidates.

The controller 40 may then use the chroma mode decision block 72 to determine distortion expected to result when each of the candidate chroma intra-frame prediction modes is used to encode the chroma prediction block (process block 108). In some embodiments, the expected distortion may be the expected difference between decoded image data and corresponding source image data. Thus, expected distortion of a candidate chroma intra-frame prediction mode may be sum of expected distortion of each chroma prediction block (e.g., Cr chroma prediction block and Cb chroma prediction block).

Figure 10:
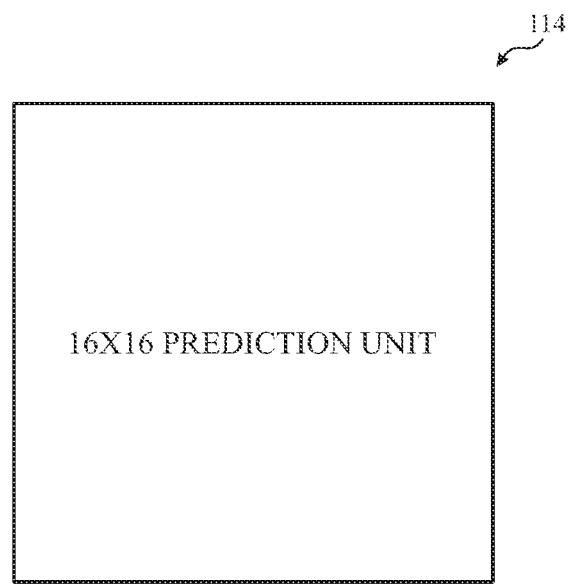
FIG. 10 is a diagrammatic representation of a 16×16 prediction unit of image data, in accordance with an embodiment.

However, as described above, a prediction unit may include one or more transform units. As such, a chroma prediction block may include one or more chroma transform blocks per chroma component. Accordingly, the total expected distortion of the chroma prediction block may be the based on expected distortion of each chroma transform block in the chroma prediction block. For example, when including a single chroma transform block, the total expected distortion of the chroma transform block is equal to expected distortion of the chroma transform block. On the other hand, when including multiple chroma transform blocks, the total expected distortion of the prediction unit is equal to the sum of the expected distortion of each of the multiple transform units To help illustrate, a diagrammatic representation of a 16×16 prediction unit 114 is depicted in FIG. 10. One of ordinary skill should appreciate that the 16×16 prediction unit 114 is merely intended to be illustrative and not limiting. In other words, in other embodiments, the prediction unit may any suitable size, such as 32×32 or 64×64 prediction unit.

As described above, a prediction unit may include a luma prediction block per luma (e.g., Y) component and a chroma prediction block per chroma (e.g., Cr and Cb) component. Additionally, as described above, size of a chroma prediction block may be dependent on chroma sampling format. For example, the chroma prediction block may be the same size as the prediction unit when a 4:4:4 sampling format is used, half the horizontal size of the prediction unit when a 4:2:2 sampling format is used, and half the horizontal and half the vertical size of the prediction unit when a 4:2:0 sampling format is used.

Figure 14:
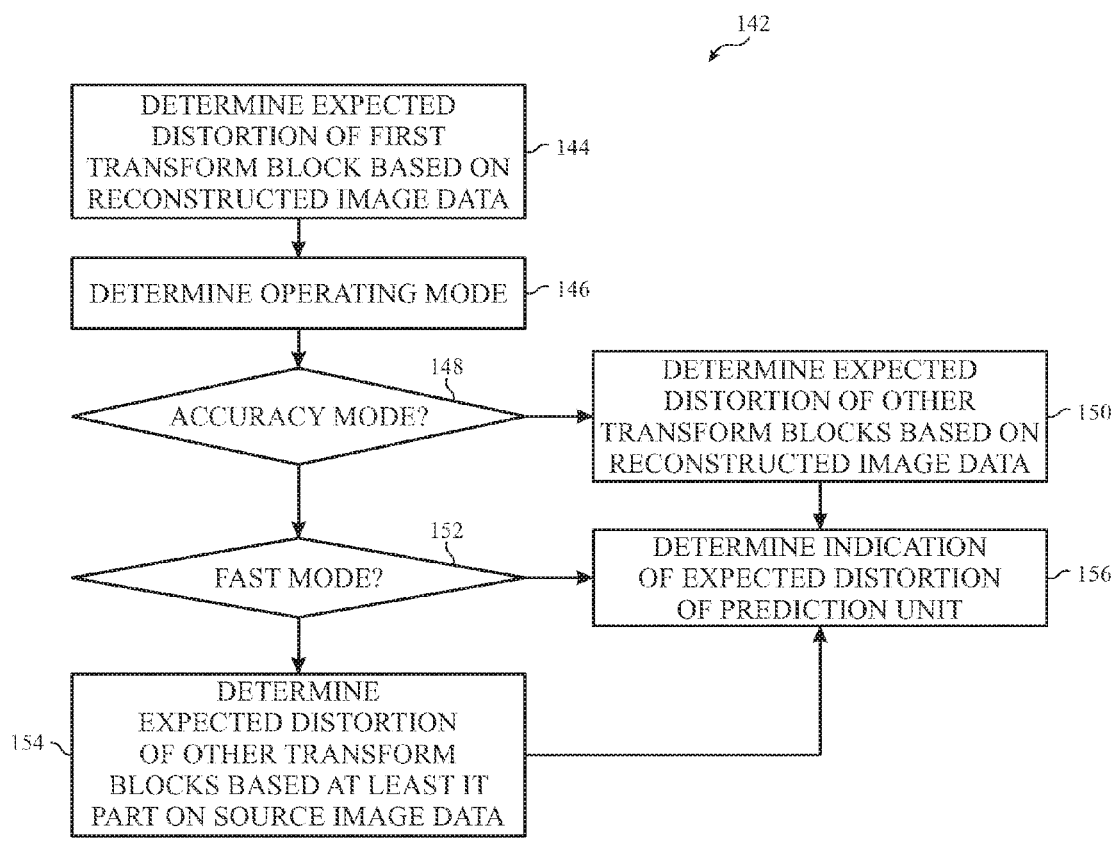
FIG. 14 is a flow diagram of a process for determining expected distortion of a prediction unit, in accordance with an embodiment.

To help illustrate, diagrammatic representations of chroma prediction blocks that may be determined from the 16×16 prediction unit 114 are depicted in FIGS. 12-14. More specifically, FIG. 11 depicts a diagrammatic representation of a 16×16 chroma prediction block 116 determined using a 4:4:4 sampling format. As described above, a chroma prediction block may include multiple chroma transform block per chroma component. For example, in the depicted embodiment, the 16×16 chroma prediction block 116 is divided into a first 8×8 chroma transform block 118, a second 8×8 chroma transform block 120, a third 8×8 chroma transform block 122, and a fourth 8×8 chroma transform block 124. Accordingly, the total expected distortion of the 16×16 chroma prediction block 116 may be determined as a sum of expected distortion of the first 8×8 chroma transform block 118, expected distortion of the second 8×8 chroma transform block 120, expected distortion of the third 8×8 chroma transform block 122, and expected distortion of the fourth 8×8 chroma transform block 124.

Additionally, FIG. 12 depicts a diagrammatic representation of an 8×8 chroma prediction block 126 determined using a 4:2:0 sampling format on the 16×16 prediction unit 114. In the depicted embodiment, the 8×8 chroma prediction block 126 is divided into divided into a first 4×4 chroma transform block 128, a second 4×4 chroma transform block 130, a third 4×4 chroma transform block 132, and a fourth 4×4 chroma transform block 134. Accordingly, the total expected distortion of the 8×8 chroma prediction block 126 may be determined as a sum of expected distortion of the first 4×4 chroma transform block 128, expected distortion of the second 4×4 chroma transform block 130, expected distortion of the third 4×4 chroma transform block 132, and expected distortion of the fourth 4×4 chroma transform block 134.

Furthermore, FIG. 13 depicts a diagrammatic representation of an 8×16 chroma prediction block 136 determined using a 4:2:2 sampling format on the 16×16 prediction unit 114. In the depicted embodiment, the 8×16 chroma prediction block 138 is divided into a top 8×8 chroma transform block 138 and a bottom 8×8 chroma transform block 140. Accordingly, the total expected distortion of the 8×16 chroma prediction block 136 may be determined as a sum of expected distortion of the top 8×8 chroma transform block 138 and the expected distortion of the bottom 8×8 chroma transform block 140.

As described above, the expected distortion may be determined based at least in part on a prediction sample. In some embodiments, the prediction sample may be determined by applying a chroma intra-frame prediction mode based on neighboring image data. For example, a chroma prediction sample of a chroma transform block may be determined based on first top neighboring image data and second neighboring image data. In some embodiments, the first neighboring image data may be from a top neighboring block and the second neighboring image data may be from a left neighboring block. Thus, when determined based on neighboring reconstructed image data, prediction samples of multiple chroma transform blocks in chroma prediction block and, thus, expected distortion of the multiple chroma transform blocks may be determined serially.

For example, with regard to FIG. 13, the top neighboring image data of the bottom 8×8 chroma transform block 140 is part of the top 8×8 chroma transform block 138. Thus, to determine a chroma prediction sample of the bottom 8×8 chroma transform block 140 based on reconstructed image data, the chroma reconstruction block 60 may first determine a reconstructed chroma sample of the top 8×8 chroma transform block 140. To further illustrate, with regard to FIG. 11, the left neighboring image data of the fourth 8×8 chroma transform block 124 may be included in the third 8×8 chroma transform block 122 and the top neighboring image data may be included in the second 8×8 chroma transform block 120. Thus, to determine a chroma prediction sample of the fourth 8×8 chroma transform block 124 based on reconstructed image data, the chroma reconstruction block 60 may first determine reconstructed chroma samples of both the second 8×8 chroma transform block 120 and the third 8×8 chroma transform block 122.

However, determining prediction samples and, thus, expected distortion of multiple chroma transform blocks serially based on reconstructed image data from neighboring transform blocks may increase computational complexity. Thus, in some embodiments, the chroma reconstruction block 60 may determine chroma prediction samples based at least in part on source chroma image data to enable determining expected distortion of multiple chroma transform blocks completely or at least partially in parallel. In this manner, determining expected distortion of multiple chroma transform blocks based at least in part on source image data may facilitate reducing computation complexity and, thus, operating duration and/or power consumption of the chroma reconstruction block 60.

Additionally, in some embodiments, the chroma reconstruction block 60 may use expected distortion of one (e.g., first or top) of the multiple chroma transform blocks as an indication of the expected distortion of the chroma prediction block. In such embodiments, the determination of expected distortion of other chroma transform blocks may be obviated. In this manner, operations used to determine expected distortion of the chroma prediction block may be reduced, which may further facilitate reduction operating duration of the chroma reconstruction block 60.

Although facilitating reduced operating duration, determining expected distortion based at least in part on source chroma image data and/or based on only one of multiple chroma transform blocks may reduce accuracy of the expected distortion determined. As will be described in more detail below, the chroma reconstruction block 60 may select a chroma intra-frame prediction mode used to encode the chroma components of a prediction unit based at least in part on expected distortion resulting from each candidate chroma intra-frame prediction mode. Thus, in some instances, reduced accuracy of the expected distortion may cause the chroma reconstruction block 60 to select a chroma intra-frame prediction mode that actually results in more distortion in decoded image data than another candidate. In other words, there may be tradeoffs between the various determinations of expected distortion. In fact, in some embodiments, the chroma reconstruction block 60 may dynamically switch between the various determinations based on a desired operating duration of the video encoding pipeline 34 and/or desired quality of decoded image data.

To help illustrate, one embodiment of a process 142 for determining expected distortion of a prediction unit including multiple transform blocks is described in FIG. 14. Generally, the process 142 includes determining expected distortion of a first transform block based on reconstructed image data (process block 144), determining an operating mode (process block 146), determine whether the operating mode is an accuracy mode (decision block 148), determining expected distortion of other transform blocks based on reconstructed image data when in the accuracy mode (process block 150), determining whether the operating mode is a fast mode when not in the accuracy mode (decision block 152), determining the expected distortion of the other transform blocks based at least in part on source image data when not in the fast mode (process block 154), and determining an indication of expected distortion of a prediction unit (process block 156). In some embodiments, the process 142 may be implemented by executing instructions stored in a tangible, non-transitory, computer-readable medium, such as the controller memory 44, the local memory 20, the main memory storage device 22, or the like, using processing circuitry, such as the controller processor 42, the processor core complex 18, a graphics processing unit (GPU), or the like.

Accordingly, in some embodiments, the controller 40 may use the chroma mode decision block 72 to determine expected distortion of one of multiple chroma transform blocks in a chroma prediction block based on reconstructed image data (process block 144). As described above, some neighboring chroma prediction blocks may be processed before the chroma prediction block. For example, in some embodiments, the chroma reconstruction block 60 may determine reconstructed chroma samples of a first (e.g., top) neighboring chroma prediction and a second (e.g., left) neighboring chroma prediction block before processing the chroma prediction block. In such embodiments, the chroma mode decision block 72 may determine the expected distortion of an upper left most chroma transform block based only on reconstructed image data since the top neighboring and the left neighboring reconstructed image data is available.

For example, with regard to FIG. 11, the chroma mode decision block 72 may determine a chroma prediction sample and, thus, expected distortion of the first 8×8 chroma transform block 118 based on neighboring reconstructed image data. Similarly, with regard to FIG. 12, the chroma mode decision block 72 may determine a chroma prediction sample and, thus, expected distortion of the first 4×4 chroma transform block 128 based on neighboring reconstructed image data. Furthermore, with regard to FIG. 13, the chroma mode decision block 72 may determine a chroma prediction sample and, thus, expected distortion of the top 8×8 chroma transform block 138 based on neighboring reconstructed image data.

Returning to the process 142 of FIG. 14, the controller 40 may determine operating mode of the chroma reconstruction block 60, the main pipeline 48, and/or the video encoding pipeline 34 as a whole. In some embodiments, the operating mode may indicate a desired balance between computational complexity (e.g., operating duration and/or power consumption) of the chroma reconstruction block 60 and accuracy of expected distortion of the prediction unit. For example, in the depicted embodiment, the operating mode may be an accuracy mode (e.g., slow mode), a balanced mode (e.g., normal mode), or a fast mode (e.g., turbo mode). In the accuracy mode, the expected distortion may be determined with an emphasis on improving accuracy at the expense of computational complexity. On the other end, in the fast mode, the expected distortion may be determined with an emphasis on reducing computational complexity at the expense of accuracy. In the balanced mode, the expected distortion may be determined with some compromise between computational complexity and accuracy.

In some embodiments, the operating mode may be input by a user, for example, via input structures 14. In other embodiments, the controller 40 may automatically (e.g., dynamically) adjust the operating mode based on allotted operating duration and/or allotted power consumption. In such embodiments, the controller 40 may select the operating mode that provides the highest accuracy while remaining within an allotted operating duration. For example, the controller 40 may default to the accuracy mode. However, as refresh rate and/or image frame resolution increases, which may decrease allotted operating duration, the controller 40 may dynamically switch to the balanced mode or the fast mode.

Thus, the controller 40 may determine whether the operating mode is the accuracy mode (decision block 148). As described above, in the accuracy mode, the chroma mode decision 72 may prioritize accuracy of expected distortion over operating duration. Thus, when in the accuracy mode, the controller 40 may use the chroma mode decision block 72 to determine also determine expected distortion of the other chroma transform blocks based on reconstructed image data (process block 150).

The controller 40 may then determine expected distortion of the chroma prediction block by summing together the expected distortion of each of the chroma transform block (process block 156) and total expected distortion of chroma of the prediction unit by summing together the expected distortion of each chroma transform block. As described above, reconstructed image data may indicate decoded image data expected to be determined by a decoding device. Accordingly, determining the expected distortion of based on reconstructed image data may facilitate improving accuracy of the expected distortion of each chroma transform block and, thus, the expected distortion of the prediction unit.

However, to determine based on reconstructed image data, the chroma mode decision block 72 may determine expected distortion of the multiple chroma transform blocks serially. For example, with regard to FIG. 11, the chroma mode decision block 72 may determine a reconstructed sample of the first 8×8 chroma transform block 118 before determining expected distortion of the second 8×8 chroma transform block 120 and expected distortion of the third 8×8 chroma transform block 122. Additionally, the chroma mode decision block 72 may determine reconstructed samples of the second 8×8 chroma transform block 120 and the third 8×8 chroma transform block 122 before determining expected distortion of the fourth 8×8 chroma transform block 124.

Similarly, with regard to FIG. 12, the chroma mode decision block 72 may determine a reconstructed sample of the first 4×4 chroma transform block 128 before determining expected distortion of the second 4×4 chroma transform block 130 and expected distortion of the third 4×4 chroma transform block 132. Additionally, the chroma mode decision block 72 may determine reconstructed samples of the second 4×4 chroma transform block 130 and the third 4×4 chroma transform block 132 before determining expected distortion of the fourth 4×4 chroma transform block 134. Furthermore, with regard to FIG. 13, the chroma mode decision block 72 may determine a reconstructed sample of the top 8×8 chroma transform block 138 before determining expected distortion of the bottom 8×8 chroma transform block 140. Thus, when in the accuracy mode, the chroma mode decision block 72 may improve accuracy of the expected distortion, which may facilitate reducing distortion in decoded image data, at the expense of computational complexity (e.g., operating duration and/or power consumption).

Returning to the process 142 of FIG. 14, when not in the accuracy mode, the controller 40 may determine whether the operating mode is the fast mode (process block 148). As described above, in the fast mode, the chroma mode decision 72 may prioritize reducing computational complexity over accuracy of the expected distortion. Thus, in some embodiments, the controller 40 may use the chroma mode decision block 72 to determine an indication of the expected distortion of the chroma prediction unit based only on the expected distortion of the one (e.g., first or top) chroma transform block when in the fast mode (process block 156) and total expected distortion of chroma of the prediction unit by summing together the expected distortion of each chroma prediction block.

In some embodiments, the chroma mode decision block 72 may determine an indication of the expected distortion of the prediction unit by extrapolating the expected distortion of the one chroma transform block to the rest of the chroma prediction block. For example, with regard to FIG. 11, the chroma mode decision block 72 may multiply the expected distortion of the first 8×8 chroma transform block 120 by four to determine an indication of the expected distortion of the 16×16 chroma prediction block 116. Similarly, with regard to FIG. 12, the chroma mode decision block 72 may multiply the expected distortion of the first 4×4 chroma transform block 128 by four to determine an indication of the expected distortion of the 8×8 chroma prediction block 126. Furthermore, with regard to FIG. 13, the chroma mode decision block 72 may multiply the expected distortion of the top 8×8 chroma transform block 138 by two to determine an indication of the expected distortion of the 8×16 chroma prediction block 136.

Since the expected distortion is not based on each chroma transform block in the chroma prediction block, the accuracy of the expected distortion of the chroma prediction block may decrease. However, since the expected distortion of only one chroma transform block is determined, the operations performed by the chroma reconstruction block 60 to evaluate a candidate chroma intra-frame prediction mode may decrease, thereby facilitating reduced computational complexity. In this manner, when in the fast mode, the chroma mode decision block 72 may facilitate decreasing computational complexity (e.g., operating duration and/or power consumption) at the expense of expected distortion accuracy, which, in some instances, may result in increased distortion in decoded image data.

Returning to the process 142 of FIG. 14, when not in the accuracy mode or the fast mode, the controller 40 may determine that the operating mode is in a balanced mode. As described above, in the balance mode, the chroma mode decision 72 may find a compromise between accuracy of expected distortion and computational complexity of the chroma reconstruction block 60. Thus, in some embodiments, the controller 40 may use the chroma mode decision block 72 to determine expected distortion of the other chroma transform blocks based at least in part on source image data (process block 154).

For example, with regard to FIG. 11, the chroma mode decision block 72 may determine a chroma prediction sample and, thus, expected distortion of the second 8×8 chroma transform block 120 based on top neighboring reconstructed image data and left neighboring source image data. Additionally, the chroma mode decision block 72 may determine a chroma prediction sample and, thus, expected distortion of the third 8×8 chroma transform block 122 based on top neighboring source image data and left neighboring reconstructed image data. Furthermore, the chroma mode decision block 72 may determine a chroma prediction sample and, thus, expected distortion of the fourth 8×8 chroma transform block 124 based on first (e.g., top) neighboring source image data and second (e.g., left) neighboring source image data.

Similarly, with regard to FIG. 12, the chroma mode decision block 72 may determine a chroma prediction sample and, thus, expected distortion of the second 4×4 chroma transform block 130 based on first (e.g., top) neighboring reconstructed image data and second (e.g., left) neighboring source image data. Additionally, the chroma mode decision block 72 may determine a chroma prediction sample and, thus, expected distortion of the third 4×4 chroma transform block 132 based on first (e.g., top) neighboring source image data and second (e.g., left) neighboring reconstructed image data. Furthermore, the chroma mode decision block 72 may determine a chroma prediction sample and, thus, expected distortion of the fourth 4×4 chroma transform block 134 based on first (e.g., top) neighboring source image data and second (e.g., left) neighboring source image data. With regard to FIG. 13, the chroma mode decision block 72 may determine a chroma prediction sample of the bottom 8×8 chroma transform block 140 based on first (e.g., top) neighboring source image data and second (e.g., left) neighboring reconstructed image data.

Returning to the process 142 of FIG. 14, the controller 40 may use the chroma mode decision block 72 to determine an indication of the expected distortion of the chroma prediction unit by summing the expected distortion of each of the multiple chroma transform block (process block 156) and total expected distortion of chroma of the prediction unit by summing together the expected distortion of each chroma prediction block. Since source image data may be less indicative of decoded image data than reconstructed image data, the accuracy of the expected distortion may be reduced compared to the accuracy mode. However, since the expected distortion is still based on expected distortion of each chroma transform block, the accuracy of the expected distortion of the chroma prediction block may be improved compared to the fast mode.

On the other hand, determining expected distortion of each chroma transform block may still be more computationally complex than determining expected distortion of a single chroma transform block, which may result in increasing computational complexity compared to the fast mode. However, determining the expected distortion based at least in part on source image data may facilitate determining expected duration of multiple chroma transform block in parallel, which may facilitate reducing computational complexity (e.g., operating duration and/or power consumption) compared to the accuracy mode. As such, when in the balance mode, the chroma mode decision 72 may find a compromise between accuracy of expected distortion and computational complexity of the chroma reconstruction block 60.

As described above, in some embodiments, the chroma mode decision block 72 may quantify the expected distortion using a distortion metric. For example, in some embodiments, the distortion metric may be the sum-of-squared-difference (SSD) between the source chroma sample and a corresponding reconstructed chroma sample. However, as described, determining reconstructed chroma samples may be computationally complex and, thus, affect operating duration and/or power consumption of the chroma reconstruction block 60, particularly if reconstructed chroma samples are determined for each candidate chroma intra-frame prediction mode.

Accordingly, in some embodiments, the chroma mode decision block 72 may additionally or alternatively determine the distortion metric based on the source chroma sample and a corresponding chroma prediction sample. For example, the distortion metric may be a sum-of-absolute-transformed-difference (SATD) between the source chroma sample and the chroma prediction sample. In some embodiments, to determine the sum-of-absolute-transformed-difference, the chroma mode decision block 72 may perform a frequency transform (e.g., a Hadamard transform) on difference between the source chroma sample and the chroma prediction sample.

Additionally, when determining the distortion metric based on reconstructed samples, the chroma reconstruction block 60 may determine that the reconstructed chroma sample may be determined without performing the transforms. In other words, the chroma reconstruction block 60 may determine the reconstructed chroma samples by performing a forward quantization and an inverse quantization on a chroma prediction residual to determine a reconstructed chroma prediction residual and applying the reconstructed chroma prediction residual to a chroma prediction sample.

Accordingly, to determine the distortion metric, the chroma mode decision block 72 may determine whether to skip performing transforms (e.g., forward transform and inverse transform) when determining a reconstructed sample of a chroma transform block. As described above, the chroma reconstruction block 60 may perform the transforms to facilitate improving compression efficiency (e.g., bits used to indicate a prediction residual). Generally, the transforms may be more effective when content has smooth transitions (e.g., in natural content) and less effective when the content has sharp transitions and/or large discontinuities (e.g., in synthetic content). As such, the chroma mode decision block 72 may determine whether the transforms should be skipped based at least in part on characteristics of content indicated by the source image data.

Figure 15:
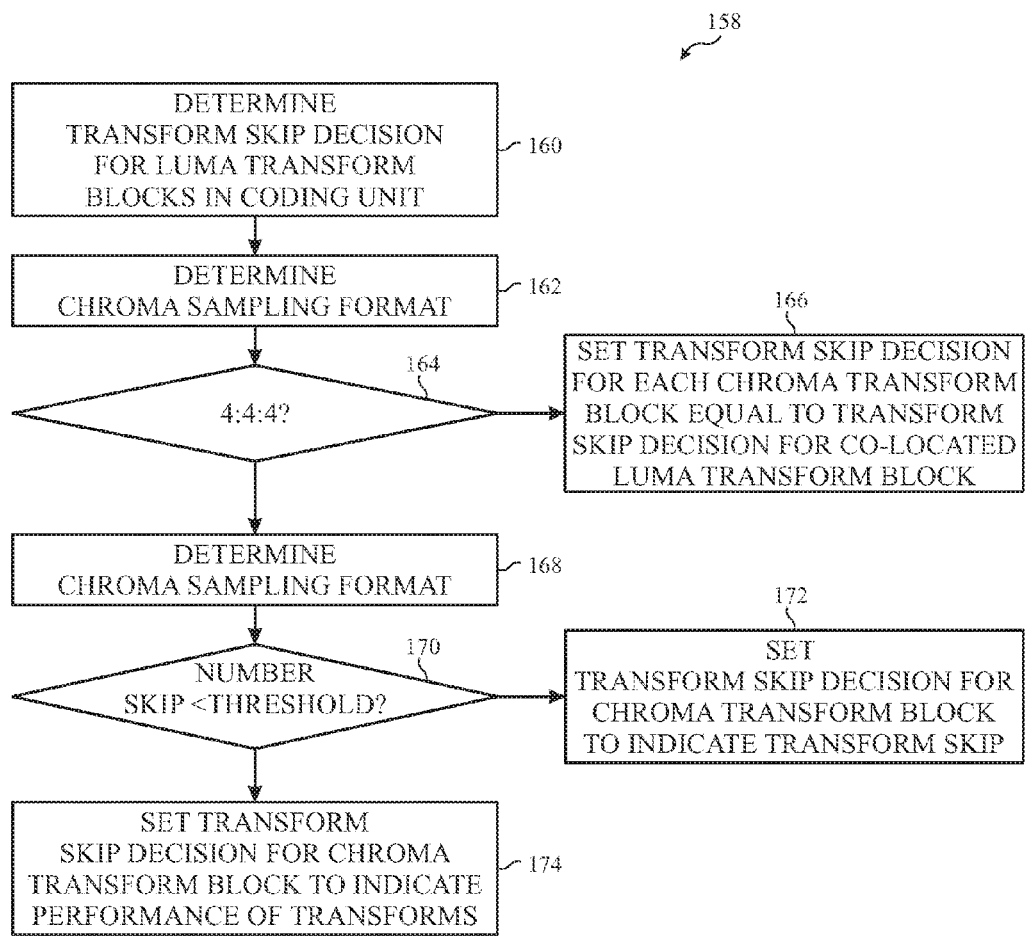
FIG. 15 is a flow diagram of a process for determining transform skip decision of a transform block, in accordance with an embodiment.

One embodiment of a process 158 for determining whether to skip transforms is described in FIG. 15. Generally, the process 158 includes determining transform skip decision for luma transform blocks in a coding unit (process block 160), determining chroma sampling format (process block 162), determining whether the chroma sampling format is a 4:4:4 sampling format (decision block 164), setting transform skip decision for each chroma transform block equal to transform skip decision for co-located luma transform block when the 4:4:4 sampling format (process block 166). When not the 4:4:4 sampling format, the process 158 includes determining a transform skip threshold (process block 168), determining whether number of luma transform blocks with transform skips is greater than the transform skip threshold (decision block 170), setting transform skip decision for chroma transform blocks to indicate transform skip when the number is greater than the transform skip threshold (process block 172), and setting transform skip decision for chroma transform blocks to indicate performance of transform when the number is not greater than the transform skip threshold (process block 174). In some embodiments, the process 158 may be implemented by executing instructions stored in a tangible, non-transitory, computer-readable medium, such as the controller memory 44, the local memory 20, the main memory storage device 22, or the like, using processing circuitry, such as the controller processor 42, the processor core complex 18, a graphics processing unit (GPU), or the like.

To indicate a transform skip, the mode decision block 58 may set a transform flag corresponding with a luma transform block. Thus, the chroma mode decision block 72 may receive the transform flags from the mode decision block 58 to determine the transform skip decision (e.g., whether a transform is performed) for each luma transform block in the coding unit. Additionally, in this manner, the chroma mode decision block 72 may determine number of luma transform blocks in the coding unit that perform transforms and number of luma transform blocks in the coding unit that skip transforms.

The controller 40 may also use the chroma mode decision block 72 to determine chroma sampling format used to determine a chroma component of the coding unit (process block 162). As described above, the chroma sampling format may be used to determine a chroma coding block per chroma component of the coding unit, a chroma prediction block per chroma component of a prediction unit, and a chroma transform block per chroma component of a transform unit.

Additionally, as described above, the chroma sampling format may indicate resolution a chroma component is sampled compared to resolution a luma component is sampled. In some sampling formats, a chroma component may be sampled at a different resolution compared to the luma component. For example, using a 4:2:2 sampling format, a chroma transform block may be half the resolution of a luma transform block. Additionally, using a 4:2:0 sampling format, a chroma transform block may be a quarter the resolution of a luma transform block. In other sampling formats (e.g., a 4:4:4 sampling format), a chroma transform block may sampled at the same resolution as a luma transform block. Thus, in such sampling formats, each chroma transform block may be co-located with a corresponding luma transform block.

Accordingly, the controller 40 may use the chroma mode decision block 72 to determine whether the chroma sampling format is the 4:4:4 sampling format (decision block 164). When using the 4:4:4 sampling format, the controller 40 may use the chroma mode decision block 72 to set transform skip decision for each chroma transform block in the coding unit equal to the transform skip decision for a co-located luma transform block (process block 166). In other words, when transforms are skipped for a transform block, the chroma mode decision block 72 may determine that the transforms should be skipped for a co-located chroma transform block. On the other hand, when transforms are performed for the transform block, the chroma mode decision block 72 may determine that the transforms should be skipped for the co-located chroma transform block. In some embodiments, the chroma mode decision block 72 may set a transform skip flag to indicate transform skip for a chroma transform block.

When not using the 4:4:4 sampling format, a chroma transform block may overlap with a luma transform block, but not be completely co-located. As such, the controller 40 may used the chroma mode decision block 72 to determine a transform skip threshold to facilitate determining the transform skip decision for the chroma transform blocks (process block 168). In some embodiments, the transform skip threshold provides an indication of whether to skip transforms for chroma transform blocks in the coding unit based on number of luma transform blocks in the coding unit with transform skips.

As such, the controller 40 may use the chroma mode decision block 72 to determine whether the number of luma transform with transform skips is greater than the transform skip threshold (decision block 170). When greater than the transform skip threshold, the controller 40 may use the chroma mode decision block 72 to set transform skip decision for each chroma transform block of the coding unit to indicate transform skip (process block 172). On the other hand, when not greater than the threshold skip threshold, the controller 40 may use the chroma mode decision block 72 to set transform skip decision for each chroma transform block of the coding unit to indicate performance of transforms (process block 174).

In this manner, instead of directly based on source image data, the chroma mode decision block 72 may determine the transform skip decision for the chroma transform blocks based on the transform skip decision of luma transform block in the same coding unit. As such, computation performed by the chroma mode decision block 72 may be reduced, thereby facilitating reduced operating duration and/or circuitry to implement the computation. Moreover, in other embodiments, the chroma mode decision block 72 may determine the transform skip decision block using the voting techniques used with the other chroma sampling formats (e.g., 4:2:2 or 4:2:0) when the 4:4:4 chroma sampling formats.

In some embodiment, the chroma mode decision block 72 may start at a default transform skip threshold. For example, when a coding unit includes four luma transform blocks, the chroma mode decision block 72 may set the transform skip threshold at one by default. Thus, when number two or more luma transform blocks skip transforms, the chroma mode decision block 72 may set the transform skip decision of each of the chroma transform blocks to indicate transform skip. In other embodiments, the skip threshold may be set at any default number, such as zero, two, three, and the like.

To improve accuracy of the transform skip decision for the chroma transform blocks, the chroma mode decision block 72 may dynamically adjust the transform skip threshold based on encoding parameters used to encode the source image data. In some embodiments, adjustments to the transform skip threshold may be based at least in part on transform skip decision for luma transform blocks neighboring (e.g., top and/or left as discussed in the examples herein, but bottom, right, and/or other neighboring transform blocks in other embodiments) the coding unit, transform skip decision for chroma transform block for chroma transform blocks neighboring the coding unit, transform skip decision made in a previous image frame, luma prediction modes used to encode the coding unit, chroma prediction modes used to encode the coding unit, or any combination thereof. For example, a greater number of neighboring luma transform blocks with transform skips may indicate a reduced likelihood that performing the transforms will improve encoding efficiency. As such, the chroma mode decision block 72 may decrease the transform skip threshold to increase likelihood determining a transform skip for the chroma transform blocks. In this manner, the chroma mode decision block 72 may determine transform skip decision of a chroma transform block and, thus, an appropriate distortion metric to indicate expected distortion associated with each candidate intra-frame prediction mode.

Returning to the process 105 of FIG. 9, the controller 40 may use the chroma mode decision block 72 to determine a rate-distortion cost associated with each of the candidate chroma intra-frame prediction modes based at least in part on the corresponding distortion metrics (process block 110). In some embodiments, the chroma mode decision block 72 may determine the rate-distortion cost using equation (1). In such embodiments, chroma mode decision block 72 may also determine estimated rate associated with each candidate chroma intra-frame prediction mode. As described above, the estimated rate of a chroma intra-frame prediction mode may include number of bits expected to be used to indicate the chroma intra-frame prediction mode and/or a corresponding chroma prediction residual.

Based on the associated rate-distortion costs, the controller 40 may then use the chroma mode decision block 72 to select a chroma intra-frame prediction mode from the multiple candidate chroma intra-frame prediction modes (process block 112). For example, when the rate-distortion cost is determine using equation (1), the chroma mode decision block 72 may select the chroma intra-frame prediction mode with the lowest associated rate-distortion cost. In this manner, the chroma reconstruction block 60 may determine a chroma intra-frame prediction mode used to encode each chroma prediction block in the coding unit.

Returning to the process 82 of FIG. 8, the controller 40 may use the chroma reconstruction block 60 to determine a chroma prediction sample of a transform block (process block 98). In some embodiments, the chroma reconstruction block 60 may determine the chroma prediction sample of the chroma transform block by applying the selected chroma intra-frame prediction mode based on neighboring reconstructed image data. For example, utilizing a vertical intra-frame prediction mode, the chroma reconstruction block 60 may produce a chroma prediction sample of the chroma transform block with each column set to reconstructed image data for a pixel directly above the column. Additionally, utilizing a DC intra-frame prediction mode, the chroma reconstruction block 60 may determine a chroma prediction sample of the chroma transform block pixel set equal to an average of the neighboring top and left reconstructed image data.

Based on the chroma prediction sample, the controller 40 may use the chroma reconstruction block 60 to determine a chroma prediction residual of the chroma transform block (process block 99). In some embodiments, the chroma reconstruction block 60 may determine the chroma prediction residual based on difference between the chroma prediction sample and source chroma image data corresponding with the chroma transform block.

Additionally, based on the chroma prediction residual, the controller 40 may use the chroma reconstruction block 60 to determine a reconstructed chroma prediction residual (process block 100). In some embodiments, the chroma reconstruction block 60 may determine the reconstructed prediction residual by performing a forward transform, a forward quantization, an inverse transform, and an inverse quantization on the chroma prediction residual. However, in some instances, the chroma reconstruction block 60 may skip the transforms (e.g., forward transform and inverse transform), for example, based on the transform skip decision described above. In other words, in such instances, the reconstructed prediction residual may be determined by performing a forward quantization and an inverse quantization.

Based on the reconstructed chroma sample, the controller 40 may use the chroma reconstruction block 60 to determine a reconstructed chroma sample of the chroma transform block (process block 101). In some embodiments, the chroma reconstruction block 60 may determine the reconstructed chroma sample by applying (e.g., adding) the reconstructed chroma prediction residual to the chroma prediction sample of the chroma transform block. As described above, when the prediction unit includes multiple transform blocks, the reconstructed chroma sample of one chroma transform block may be used to determine the reconstructed chroma sample of another chroma transform block.

Accordingly, the controller 40 may use the chroma reconstruction block 60 to determine whether the chroma transform block is the last chroma transform block in the prediction unit (decision block 102). When not the last chroma transform block, the determine a chroma prediction sample of a next chroma transform block, a chroma prediction residual based on the chroma prediction sample, a reconstructed chroma prediction residual based on the chroma prediction residual, and a reconstructed chroma sample of the chroma transform block based on the chroma prediction sample and the reconstructed chroma prediction residual.

Once the reconstructed chroma sample for the last chroma transform block is determined, the controller 40 may use the chroma reconstruction block 60 to determine a reconstructed chroma sample of the prediction unit (process block 104). In some embodiments, the chroma reconstruct block 60 may determine the reconstructed chroma sample of the prediction unit by piecing together the reconstructed chroma samples of each of the chroma transform blocks in the prediction unit. As described above, the reconstructed chroma samples may then be stored and used to encode subsequent source image data.

Accordingly, the embodiment described in present disclosure may improve operational efficiency of a video encoding pipeline, for example, by reducing computational complexity and, thus, operating duration of the video encoding pipeline, amount of circuitry used to implement the video encoding pipeline (e.g., hardware footprint), and/or power consumption of the video encoding pipeline. In some embodiments, the chroma reconstruction block may facilitate reducing computational complexity (e.g., operating duration and/or power consumption) by evaluating candidate intra-frame prediction modes based at least in part on neighboring source image data instead of only based on neighboring reconstructed image data. Additionally, in some embodiments, the chroma reconstruction block may facilitate reducing operating duration by determining transform skip decision of a chroma transform block based at least in part on transform skip decision of a luma transform block in the same coding unit and/or skip decision of neighboring chroma transform blocks instead of directly based on analysis of the source image data.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A computing device comprising a video encoding pipeline configured to encode source image data input to the video encoding pipeline, wherein:
   the video encoding pipeline comprises:
      a mode decision block configured to determine number of luma transform blocks in a coding unit that have a transform skip flag, wherein the transform skip flag indicates that a forward transform and an inverse transform are not performed to generate a reconstructed luma sample of a luma transform block; and
      a chroma reconstruction block configured to:
         determine a first reconstructed chroma sample of a first chroma transform block included within the coding unit at least in part by performing the forward transform and the inverse transform on a first chroma prediction residual of the first chroma transform block when the number of luma transform blocks in the coding unit that have the transform skip flag is not greater than a transform skip threshold; and determine the first reconstructed chroma sample of the first chroma transform block without performing the forward transform and the inverse transform on the first chroma prediction residual when the number of luma transform blocks in the coding unit that have the transform skip flag is greater than the transform skip threshold; and the video encoding pipeline is configured to encode the source image data corresponding with a second chroma transform block based at least in part on the first reconstructed chroma sample of the first chroma transform block.

2. The computing device of claim 1, wherein the video encoding pipeline is configured to adjust the transform skip threshold based at least in part on gradient of a luma component of the source image data corresponding with the coding unit, number of neighboring luma transform blocks with the transform skip flag, number of neighboring chroma transform blocks with the transform skip flag, a luma prediction mode used to encode a luma component of a luma transform block in the coding unit, a chroma intra-frame prediction mode used to encode a chroma component of the first chroma transform block in the coding unit, or any combination thereof.

3. The computing device of claim 1, wherein the chroma reconstruction block is configured to:

determine a chroma prediction sample of the second chroma transform block at least in part by applying a chroma intra-frame prediction mode using the first reconstructed chroma sample;

determine a second chroma prediction residual of the second chroma transform block based at least in part on difference between the chroma prediction sample and the source image data corresponding with the second chroma transform block; and determine an encoded chroma prediction residual based at least in part on the second chroma prediction residual, wherein the encoded chroma prediction residual is configured to be used by a decoding device to determine decoded image data corresponding with the second chroma transform block.

4. The computing device of claim 1, wherein the chroma reconstruction block is configured to:

determine a plurality of chroma prediction samples of the first chroma transform block, wherein one or more of the plurality of chroma prediction samples is determined at least in part by applying a corresponding one of a plurality of candidate intra-frame prediction modes using image data neighboring the first chroma transform block;

determine a plurality of distortion metrics, wherein each of the plurality of distortion metrics indicates expected distortion in the first chroma transform block when a corresponding one of the plurality of candidate intra-frame prediction modes is implemented; and select a chroma prediction mode from the plurality of candidate intra-frame prediction modes based at least in part on the plurality of distortion metrics.

5. The computing device of claim 1, wherein:

the video encoding pipeline is configured to determine whether the source image data corresponding with the coding unit likely comprises synthetic content based at least in part on gradient of a luma component of the source image data; and the chroma reconstruction block is configured to determine the first reconstructed chroma prediction residual by performing the forward quantization and the inverse quantization on the first chroma prediction residual when the video encoding pipeline determines that the source image data corresponding with the coding unit likely comprises synthetic content.

6. The computing device of claim 1, wherein:

the coding unit comprises a third chroma transform block and a fourth chroma transform block when the source image data is sampled with a 4:4:4 sampling format or a 4:2:0 sampling format; and the chroma reconstruction block is configured to:

determine each of a plurality of first chroma prediction samples of the first chroma transform block at least in part by applying a corresponding one of a plurality of candidate chroma intra-frame prediction modes using first top neighboring reconstructed image data of the first chroma transform block, first left neighboring reconstructed image data of the first chroma transform block, or both;

determine one or more of a plurality of second chroma prediction samples of the second transform block at least in part by applying a corresponding one of the plurality of candidate chroma intra-frame prediction modes using first top neighboring source image data of the second chroma transform block, second left neighboring reconstructed image data of the second chroma transform block, or both;

determine each of a plurality of third chroma prediction samples of the third chroma transform block at least in part by applying a corresponding one the plurality of candidate chroma intra-frame prediction modes using second top neighboring reconstructed image data of the third chroma transform block, first left neighboring source image data of the third chroma transform block, or both; and determine each of a plurality of fourth chroma prediction samples of the fourth chroma transform at least in part by applying a corresponding one of the plurality of candidate chroma intra-frame prediction modes using second top neighboring source image data of the fourth chroma transform block, second left neighboring source image data of the fourth chroma transform block, or both.

7. The computing device of claim 4, wherein:

the first chroma transform block is above the second chroma transform block when the source image data is sampled with a 4:2:2 sampling format; and the chroma reconstruction block is configured to:

determine each of a plurality of first chroma prediction samples of the first chroma transform block at least in part by applying a corresponding one of a plurality of candidate chroma intra-frame prediction modes using top neighboring reconstructed image data of the first chroma transform block, first left neighboring reconstructed image data of the first chroma transform block, or both; and determine each of a plurality of second chroma prediction samples of the second transform block at least in part by applying a corresponding one of the plurality of candidate chroma intra-frame prediction modes using top neighboring source image data of the second chroma transform block, second left neighboring reconstructed image data of the second chroma transform block, or both.

8. The computing device of claim 1, wherein the computing device comprises a portable phone, a media player, a personal data organizer, a handheld game platform, a tablet device, a computer, or any combination thereof.

9. A tangible, non-transitory, computer-readable medium that stores instructions executable by one or more processors in a video encoding pipeline, wherein the instructions comprise instructions to:
- determine, using the one or more processors, number of luma transform blocks in a coding unit that have a transform skip flag, wherein the transform skip flag indicates that a forward transform and an inverse transform are not performed to generate a reconstructed luma sample of a luma transform block;
- determine, using the one or more processors, a transform skip threshold;
- determine, using the one or more processors, a first reconstructed chroma sample of a first chroma transform block in the coding unit at least in part by performing the forward transform and the inverse transform on a first chroma prediction residual of the first chroma transform block when the number of luma transform blocks in the coding unit that have the transform skip flag is not greater than the transform skip threshold;
- determine, using the one or more processors, the first reconstructed chroma sample of the first chroma transform block without performing the forward transform and the inverse transform on the first chroma prediction residual when the number of luma transform blocks in the coding unit that have the transform skip flag is greater than the transform skip threshold; and
- encode, using the one or more processors, source image data corresponding with a second chroma transform block based at least in part on the first reconstructed chroma sample of the first chroma transform block.

10. The tangible, non-transitory, computer-readable medium of claim 9, wherein the instructions comprise instructions to adjust the transform skip threshold based at least in part on gradient of a luma component of the source image data corresponding with the coding unit, number of neighboring luma transform blocks with the transform skip flag, number of neighboring chroma transform blocks with the transform skip flag, a luma prediction mode used to encode a luma component of a luma transform block in the coding unit, a chroma prediction mode used to encode a chroma component of the first chroma transform block in the coding unit, or any combination thereof.

11. The tangible, non-transitory, computer-readable medium of claim 9, wherein the instructions to encode the source image data corresponding with the second chroma transform block comprise instructions to:
- determine, using the one or more processors, a chroma prediction sample of the second chroma transform block at least in part by applying a chroma intra-frame prediction mode based at least in part on using the first reconstructed chroma sample;
- determine, using the one or more processors, a second chroma prediction residual of the second chroma transform block based at least in part on difference between the chroma prediction sample and the source image data corresponding with the second chroma transform block; and
- determine, using the one or more processors, an encoded chroma prediction residual based at least in part on the second chroma prediction residual, wherein the encoded chroma prediction residual is configured to be used by a decoding device to determine decoded image data corresponding with the second chroma transform block.

12. The tangible, non-transitory, computer-readable medium of claim 9, comprising instructions to:
- determine, using the one or more processors, a plurality of chroma prediction samples of the first chroma transform block, wherein one or more of the plurality of chroma prediction samples is determined at least in part by applying a corresponding one of a plurality of candidate intra-frame prediction modes based at least in part on using image data neighboring the first chroma transform block;
- determine, using the one or more processors, a plurality of distortion metrics, wherein each of the plurality of distortion metrics indicates expected distortion in decoded image data corresponding with the first chroma transform block when a corresponding one of the plurality of candidate intra-frame prediction modes is implemented; and
- select, using the one or more processors, a chroma intra-frame prediction mode from the plurality of candidate intra-frame prediction modes based at least in part on the plurality of distortion metrics.

13. The tangible, non-transitory, computer-readable medium of claim 9, wherein the instructions to determine the first reconstructed chroma sample of the first chroma transform block comprise instructions to:
- determine, using the one or more processors, a chroma prediction sample of the first chroma transform block at least in part by applying a chroma intra-frame prediction mode based on using neighboring reconstructed image data;
- determine, using the one or more processors, the first chroma prediction residual based at least in part on difference between the chroma prediction sample and the source image data corresponding with the first chroma transform block; and
- apply, using the one or more processors, the first reconstructed chroma prediction residual to the chroma prediction sample to determine the first reconstructed chroma sample.

14. A method comprising:
- determining, using a video encoding pipeline, number of luma transform blocks in a coding unit that have a transform skip flag, wherein the transform skip flag indicates that a forward transform and an inverse transform are not performed to generate a reconstructed luma sample of a luma transform block;
- determining, using the video encoding pipeline, a first reconstructed chroma sample of a first chroma transform block unit included within the coding unit at least in part by performing the forward transform and the inverse transform on a first chroma prediction residual of the first chroma transform block when the number of luma transform blocks in the coding unit that have the transform skip flag is not greater than a transform skip threshold;
- determining, using the video encoding pipeline the first reconstructed chroma sample of the first chroma transform block without performing the forward transform and the inverse transform on the first chroma prediction residual when the number of luma transform blocks in the coding unit that have the transform skip flag is greater than the transform skip threshold; and
- encoding, using the video encoding pipeline, source image data corresponding with a second chroma transform block based at least in part on the first reconstructed chroma sample of the first chroma transform block.

15. The method of claim 14, comprising adjusting, using the video encoding pipeline, the transform skip threshold based at least in part on gradient of a luma component of the source image data corresponding with the coding unit, number of neighboring luma transform blocks with the transform skip flag, number of neighboring chroma transform blocks with the transform skip flag, a luma prediction mode used to encode a luma component of a luma transform block in the coding unit, a chroma prediction mode used to encode a chroma component of the first chroma transform block in the coding unit, or any combination thereof.

16. The method of claim 14, comprising,
  determining, using the video encoding pipeline, a chroma prediction sample of the second chroma transform block at least in part by applying a chroma intra-frame prediction mode using the first reconstructed chroma sample;
  determining, using the video encoding pipeline, a second chroma prediction residual of the second chroma transform block based at least in part on a difference between the chroma prediction sample and the source image data corresponding with the second chroma transform block; and
  determining, using the video encoding pipeline, an encoded chroma prediction residual based at least in part on the second chroma prediction residual, wherein the second chroma prediction residual is configured to be used by a decoding device to determine decoded image data corresponding with the second chroma transform block.

17. The method of claim 14, comprising:
  determining, using the video encoding pipeline, a plurality of chroma prediction samples of the first transform block, wherein one or more of the plurality of chroma prediction samples is determined at least in part by applying a corresponding one of a plurality of candidate intra-frame prediction modes using image data neighboring the first chroma transform block;
  determining, using the video encoding pipeline, a plurality of distortion metrics, wherein each of the plurality of distortion metrics indicates expected distortion in decoded image data corresponding with the first chroma transform block when a corresponding one of the plurality of candidate intra-frame prediction modes is implemented; and
  selecting, using the video encoding pipeline, a chroma intra-frame prediction mode from the plurality of candidate intra-frame prediction modes based at least in part on the plurality of distortion metrics.

18. The method of claim 14, comprising:
  determining, using the video encoding pipeline, a chroma prediction sample of the first chroma transform block at least in part by applying a chroma intra-frame prediction mode using neighboring reconstructed image data;
  determining, using the video encoding pipeline, the first chroma prediction residual based at least in part on difference between the chroma prediction sample and the source image data corresponding with the first chroma transform block; and
  applying, using the video encoding pipeline, the reconstructed chroma prediction residual to the chroma prediction sample to determine the first reconstructed chroma sample.

19. The computing device of claim 1, wherein the chroma reconstruction block is configured to:
  determine a chroma prediction sample of the first chroma transform block at least in part by applying a chroma intra-frame prediction mode using neighboring reconstructed image data;
  determine the first chroma prediction residual based at least in a part on difference between the chroma prediction sample and the source image data corresponding with the first chroma transform block; and
  apply the reconstructed chroma prediction residual to the chroma prediction sample to determine the first reconstructed chroma sample.

* * * * *

UNITED STATES PATENT AND TRADEMARK OFFICE
CERTIFICATE OF CORRECTION

PATENT NO.         : 10,277,896 B2
APPLICATION NO.    : 15/004479
DATED              : April 30, 2019
INVENTOR(S)        : Cote et al.

It is certified that error appears in the above-identified patent and that said Letters Patent is hereby corrected as shown below:

In the Claims

Column 36, Line 2, replace "prediction residual" with --sample--.
Column 36, Line 3, replace "quantization" with --transform--.
Column 36, Line 3, replace "quantization" with --transform--.
Column 36, Line 24, insert --chroma-- between "second" and "transform".
Column 36, Line 40, insert --block-- after "transform".

Column 38, Lines 39-40, delete "reconstructed" between "first" and "chroma".

Column 40, Lines 22-23, replace "reconstructed" with --first--.
Column 40, Line 36, replace "reconstructed" with --first--.

Signed and Sealed this
Twenty-seventh Day of October, 2020

Andrei Iancu
*Director of the United States Patent and Trademark Office*